US010680904B2

(12) United States Patent
Suzuki et al.

(10) Patent No.: US 10,680,904 B2
(45) Date of Patent: Jun. 9, 2020

(54) DETERMINING PERIODICITY OF OPERATION STATUS INFORMATION TO PREDICT FUTURE OPERATION STATUSES OF RESOURCES OF THE INFORMATION PROCESSING DEVICES

(71) Applicant: FUJITSU LIMITED, Kawasaki-shi, Kanagawa (JP)

(72) Inventors: Shigeto Suzuki, Kawasaki (JP); Hiroshi Endo, Atsugi (JP); Hiroyuki Fukuda, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 150 days.

(21) Appl. No.: 15/945,061

(22) Filed: Apr. 4, 2018

(65) Prior Publication Data
US 2018/0302295 A1    Oct. 18, 2018

(30) Foreign Application Priority Data

Apr. 17, 2017    (JP) .................................. 2017-081542

(51) Int. Cl.
*H04L 12/24*    (2006.01)
*H04L 12/26*    (2006.01)

(52) U.S. Cl.
CPC ........ *H04L 41/147* (2013.01); *H04L 43/0817* (2013.01); *H04L 41/142* (2013.01);
(Continued)

(58) Field of Classification Search
USPC ........................................................ 709/224
See application file for complete search history.

(56) References Cited

U.S. PATENT DOCUMENTS

| 2004/0143664 | A1 | 7/2004 | Usa et al. |
| 2012/0066684 | A1* | 3/2012 | Takami ................ G06F 9/5083 |
| | | | 718/102 |
| 2018/0097905 | A1* | 4/2018 | Todasco ............. H04L 67/2847 |

FOREIGN PATENT DOCUMENTS

| JP | 2004-199561 | 7/2004 |
| JP | 2010-117760 | 5/2010 |
| WO | WO 2010/140183 A1 | 12/2010 |

OTHER PUBLICATIONS

Shen et al., "A measure of credibility of solar power prediction", 2011 10th International Conference on Machine Learning and Applications, IEEE Computer Soceity, Dec. 2011, pp. 286-291.

* cited by examiner

*Primary Examiner* — Hee Soo Kim
(74) *Attorney, Agent, or Firm* — Staas & Halsey LLP

(57) ABSTRACT

An information processing device includes: a memory configured to store a management program; and a processor coupled to the memory, wherein the processor, based on the management program, performs operations of: collecting operation status information stored in a storage of each of one or more information processing devices and related to an operation status of a calculation resource of each of the one or more information processing devices; determining whether the operation status information has periodicity based on the operation status information and a threshold; producing, when it is determined that the operation status information has periodicity, past activation information related to the operation status in a past duration in which the periodicity is present; and generates a prediction value of the operation status information based on the operation status information and the past activation information.

18 Claims, 28 Drawing Sheets

(52) U.S. Cl.
CPC ...... *H04L 41/5009* (2013.01); *H04L 41/5019* (2013.01); *H04L 43/16* (2013.01)

FIG. 5

VIRTUAL MACHINE NAME: xxxxxx

500

| TIME POINT | OPERATION STATUS METRICS ||||  |
|---|---|---|---|---|---|
| | CPU USE RATE (%) | MEMORY USE RATE (%) | DISK COMMAND NUMBER (NUM) | NETWORK COMMUNICATION AMOUNT (BYTE) | ... |
| ... | ... | ... | ... | ... | ... |
| THURSDAY 9/1/2016 15:00 | 20% | 10% | 150000 | 20K | ... |
| ... | ... | ... | ... | ... | ... |
| THURSDAY 9/8/2016 15:00 | 21% | 11% | 160000 | 21K | ... |
| ... | ... | ... | ... | ... | ... |
| THURSDAY 9/15/2016 15:00 | 22% | 10% | 155000 | 19K | ... |
| ... | ... | ... | ... | ... | ... |
| THURSDAY 9/22/2016 15:00 | 19% | 9% | 145000 | 21K | ... |
| ... | ... | ... | ... | ... | ... |
| THURSDAY 9/29/2016 15:00 CURRENT | 20% | 12% | 160000 | 23K | ... |

FIG. 6

VIRTUAL MACHINE NAME : xxxxxxx

600

| TIME POINT | OPERATION STATUS METRICS ||||  |
|---|---|---|---|---|---|
|  | CPU USE RATE (%) | MEMORY USE RATE (%) | DISK COMMAND NUMBER (NUM) | NETWORK COMMUNICATION AMOUNT (BYTE) | ... |
| SUNDAY 0:00 | IN PREDETERMINED RANGE | IN PREDETERMINED RANGE | IN PREDETERMINED RANGE | IN PREDETERMINED RANGE | ... |
| SUNDAY 0:10 | OUT OF PREDETERMINED RANGE | IN PREDETERMINED RANGE | IN PREDETERMINED RANGE | IN PREDETERMINED RANGE | ... |
| ... | ... | ... | ... | ... | ... |
| SATURDAY 23:40 | IN PREDETERMINED RANGE | IN PREDETERMINED RANGE | IN PREDETERMINED RANGE | IN PREDETERMINED RANGE | ... |
| SATURDAY 23:50 | IN PREDETERMINED RANGE | IN PREDETERMINED RANGE | IN PREDETERMINED RANGE | OUT OF PREDETERMINED RANGE | ... |

FIG. 7

VIRTUAL MACHINE NAME: xxxxxxx

700

| TIME POINT | OPERATION STATUS METRICS ||||| 
|---|---|---|---|---|---|
| | CPU USE RATE (%) | MEMORY USE RATE (%) | DISK COMMAND NUMBER (NUM) | NETWORK COMMUNICATION AMOUNT (BYTE) | ... |
| SUNDAY 0:00 | 10% | 12% | 153020 | 10.25K | ... |
| SUNDAY 0:10 | 16% | 16% | 148000 | 8.5K | ... |
| ... | ... | ... | ... | ... | ... |
| THURSDAY 15:00 | 20.5% | 10% | 152500 | 20.25K | ... |
| ... | ... | ... | ... | ... | ... |
| SATURDAY 23:40 | 20% | 12% | 120000 | 18K | ... |
| SATURDAY 23:50 | 22% | 13% | 110000 | 19K | ... |

FIG. 13

VIRTUAL MACHINE NAME: xxxxxxx

500

| TIME POINT | CPU USE RATE (%) | OPERATION STATUS METRICS | | |
|---|---|---|---|---|
| | | MEMORY USE RATE (%) | DISK COMMAND NUMBER (NUM) | NETWORK COMMUNICATION AMOUNT (BYTE) |
| ⋮ | ⋮ | ⋮ | ⋮ | ⋮ |
| THURSDAY 9/1/2016 15:00 | 20% | 10% | 150000 | 20K |
| ⋮ | ⋮ | ⋮ | ⋮ | ⋮ |
| THURSDAY 9/8/2016 15:00 | 21% | 11% | 160000 | 21K |
| ⋮ | ⋮ | ⋮ | ⋮ | ⋮ |
| THURSDAY 9/15/2016 15:00 | 22% | 10% | 155000 | 19K |
| ⋮ | ⋮ | ⋮ | ⋮ | ⋮ |
| THURSDAY 9/22/2016 15:00 | 19% | 9% | 145000 | 21K |
| ⋮ | ⋮ | ⋮ | ⋮ | ⋮ |
| THURSDAY 9/29/2016 15:00 CURRENT | 20% | 12% | 160000 | 23K |

FIG. 14

VIRTUAL MACHINE NAME: xxxxxxx                                                                 500

| TIME POINT | OPERATION STATUS METRICS ||||
|---|---|---|---|---|
| | CPU USE RATE (%) | MEMORY USE RATE (%) | DISK COMMAND NUMBER (NUM) | NETWORK COMMUNICATION AMOUNT (BYTE) |
| ... | ... | ... | ... | ... |
| THURSDAY 9/1/2016 15:00 | 20% | 10% | 150000 | 20K |
| ... | ... | ... | ... | ... |
| THURSDAY 9/8/2016 15:00 | 21% | 11% | 160000 | 21K |
| ... | ... | ... | ... | ... |
| THURSDAY 9/15/2016 15:00 | 22% | 10% | 155000 | 19K |
| ... | ... | ... | ... | ... |
| THURSDAY 9/22/2016 15:00 | 19% | 9% | 145000 | 21K |
| ... | ... | ... | ... | ... |
| THURSDAY 9/29/2016 15:00 CURRENT | 20% | 12% | 160000 | 23K |
| | MAXIMUM − MINIMUM=30% → | MAXIMUM − MINIMUM =50% → | MAXIMUM − MINIMUM =20000 → | MAXIMUM − MINIMUM =50K → |

VIRTUAL MACHINE NAME: xxxxxxx                                                                 800

| | METRICS ||||
|---|---|---|---|---|
| | CPU USE RATE (%) | MEMORY USE RATE (%) | DISK COMMAND NUMBER (NUM) | NETWORK COMMUNICATION AMOUNT (BYTE) |
| PERIODICITY DETERMINATION THRESHOLD | 3% | 5% | 2000 | 5K |
| ... | ... | ... | ... | ... |

FIG. 15

VIRTUAL MACHINE NAME: xxxxxxx

| TIME POINT | OPERATION STATUS METRICS | | | | |
|---|---|---|---|---|---|
| | CPU USE RATE (%) | MEMORY USE RATE (%) | DISK COMMAND NUMBER (NUM) | NETWORK COMMUNICATION AMOUNT (BYTE) | ... |
| ⋮ | ⋮ | ⋮ | ⋮ | ⋮ | ⋮ |
| THURSDAY 9/1/2016 15:00 | 20% | 10% | 150000 | 20K | ⋮ |
| ⋮ | ⋮ | ⋮ | ⋮ | ⋮ | ⋮ |
| THURSDAY 9/8/2016 15:00 | 21% | 11% | 160000 | 21K | ⋮ |
| ⋮ | ⋮ | ⋮ | ⋮ | ⋮ | ⋮ |
| THURSDAY 9/15/2016 15:00 | 22% ...MAXIMUM | 10% | 155000 | 19K | ⋮ |
| ⋮ | ⋮ | ⋮ | ⋮ | ⋮ | ⋮ |
| THURSDAY 9/22/2016 15:00 | 19% ...MAXIMUM | 9% | 145000 | 21K | ⋮ |
| ⋮ | ⋮ | ⋮ | ⋮ | ⋮ | ⋮ |
| THURSDAY 9/29/2016 15:00 CURRENT | 20% | 12% | 160000 | 23K | ⋮ |

500

MAXIMUM − MINIMUM = 3% | MAXIMUM − MINIMUM = 2% | MAXIMUM − MINIMUM = 15000 | MAXIMUM − MINIMUM = 2K

VIRTUAL MACHINE NAME: xxxxxxx

| | METRICS | | | |
|---|---|---|---|---|
| | CPU USE RATE (%) | MEMORY USE RATE (%) | DISK COMMAND NUMBER (NUM) | NETWORK COMMUNICATION AMOUNT (BYTE) |
| PERIODICITY DETERMINATION THRESHOLD | 3% | 5% | 2000 | 5K |
| | IN PREDETERMINED RANGE | IN PREDETERMINED RANGE | OUT OF PREDETERMINED RANGE | IN PREDETERMINED RANGE |

VIRTUAL MACHINE NAME: xxxxxx ~500

| TIME POINT | OPERATION STATUS METRICS ||||
| --- | --- | --- | --- | --- |
| | CPU USE RATE (%) | MEMORY USE RATE (%) | DISK COMMAND NUMBER (NUM) | NETWORK COMMUNICATION AMOUNT (BYTE) |
| ... | ... | ... | ... | ... |
| THURSDAY 9/1/2016 15:00 | 20% | 10% | 150000 | 20K |
| THURSDAY 9/8/2016 15:00 | 21% | 11% | 160000 | 21K |
| THURSDAY 9/15/2016 15:00 | 22% | 10% | 155000 | 19K |
| THURSDAY 9/22/2016 15:00 | 19% | 9% | 145000 | 21K |
| THURSDAY 9/29/2016 15:00 CURRENT | 20% | 12% | 160000 | 23K |

AVERAGE OVER FOUR POINTS: 20.5% | AVERAGE OVER FOUR POINTS: 10% | AVERAGE OVER FOUR POINTS: 152500 | AVERAGE OVER FOUR POINTS: 20.25K

VIRTUAL MACHINE NAME: xxxxxx ~700

| TIME POINT | OPERATION STATUS METRICS ||||
| --- | --- | --- | --- | --- |
| | CPU USE RATE (%) | MEMORY USE RATE (%) | DISK COMMAND NUMBER (NUM) | NETWORK COMMUNICATION AMOUNT (BYTE) |
| SUNDAY 0:00 | 10% | 12% | 153020 | 10.25K |
| SUNDAY 0:10 | 16% | 16% | 148000 | 8.5K |
| ... | ... | ... | ... | ... |
| THURSDAY 15:00 | 20.5% | 10% | 152500 | 20.25K |
| ... | ... | ... | ... | ... |
| SATURDAY 23:40 | 20% | 12% | 120000 | 18K |
| SATURDAY 23:50 | 22% | 13% | 110000 | 19K |

FIG. 18

VIRTUAL MACHINE NAME: xxxxxx  ~700

| TIME POINT | OPERATION STATUS METRICS ||||
| | CPU USE RATE (%) | MEMORY USE RATE (%) | DISK COMMAND NUMBER (NUM) | NETWORK COMMUNICATION AMOUNT (BYTE) | ... |
|---|---|---|---|---|---|
| SUNDAY 0:00 | 10% | 12% | 153020 | 10.25K | ... |
| SUNDAY 0:10 | 16% | 16% | 148000 | 8.5K | ... |
| ... | ... | ... | ... | ... | ... |
| THURSDAY 15:10 | 20.4% | 9% | 152300 | 20.1K | ... |
| THURSDAY 15:20 | 20.5% | 10% | 152500 | 20.25K | ... |
| ... | ... | ... | ... | ... | ... |
| SATURDAY 23:40 | 20% | 12% | 120000 | 18K | ... |
| SATURDAY 23:50 | 22% | 13% | 110000 | 19K | ... |

← SET LAST ROW HERE

↓ SORTING IS PERFORMED SO THAT THURSDAY 15:10 IS LISTED LAST BECAUSE CURRENT DATE AND TIME IS THURSDAY 9/29 15:00

VIRTUAL MACHINE NAME: xxxxxx  ~700

| TIME POINT | OPERATION STATUS METRICS ||||
| | CPU USE RATE (%) | MEMORY USE RATE (%) | DISK COMMAND NUMBER (NUM) | NETWORK COMMUNICATION AMOUNT (BYTE) | ... |
|---|---|---|---|---|---|
| THURSDAY 15:20 | 20.5% | 10% | 152500 | 20.25K | ... |
| ... | ... | ... | ... | ... | ... |
| SATURDAY 23:40 | 20% | 12% | 120000 | 18K | ... |
| SATURDAY 23:50 | 22% | 13% | 110000 | 19K | ... |
| SUNDAY 0:00 | 10% | 12% | 153020 | 10.25K | ... |
| SUNDAY 0:10 | 16% | 16% | 148000 | 8.5K | ... |
| ... | ... | ... | ... | ... | ... |
| THURSDAY 15:10 | 20.4% | 9% | 152300 | 20.1K | ... |

FIG. 19

VIRTUAL MACHINE NAME: xxxxxx

500

| TIME POINT | OPERATION STATUS METRICS ||||| PAST OPERATION STATUS METRICS |
|---|---|---|---|---|---|---|
| | CPU USE RATE (%) | MEMORY USE RATE (%) | DISK COMMAND NUMBER (NUM) | NETWORK COMMUNICATION AMOUNT (BYTE) | ... | |
| ... | ... | ... | ... | ... | ... | ... |
| THURSDAY 8/25/2016 14:50 | 20% | 10% | 15000 | 20K | ... | |
| THURSDAY 8/25/2016 15:00 | 20% | 10% | 150000 | 20K | ... | |
| THURSDAY 8/25/2016 15:10 | 20% | 11% | 142000 | 23K | ... | |
| ... | ... | ... | ... | ... | ... | |
| THURSDAY 9/1/2016 14:50 | 20% | 10% | 15000 | 20K | ... | |
| THURSDAY 9/1/2016 15:00 | 20% | 10% | 150000 | 20K | ... | "PAST OPERATION STATUS METRICS" THURSDAY 15:20 TO THURSDAY 15:10 |
| THURSDAY 9/1/2016 15:10 | 21% | 11% | 152000 | 21K | ... | |
| ... | ... | ... | ... | ... | ... | |
| THURSDAY 9/8/2016 14:50 | 21% | 11% | 16000 | 21K | ... | |
| THURSDAY 9/8/2016 15:00 | 21% | 11% | 160000 | 21K | ... | "PAST OPERATION STATUS METRICS" THURSDAY 15:20 TO THURSDAY 15:10 |
| THURSDAY 9/8/2016 15:10 | 21% | 11% | 16000 | 21K | ... | |
| ... | ... | ... | ... | ... | ... | |
| THURSDAY 9/15/2016 14:50 | 22% | 10% | 15000 | 19K | ... | |
| THURSDAY 9/15/2016 15:00 | 22% | 10% | 155000 | 19K | ... | "PAST OPERATION STATUS METRICS" THURSDAY 15:20 TO THURSDAY 15:10 |
| THURSDAY 9/15/2016 15:10 | 21% | 10% | 150000 | 18K | ... | |
| ... | ... | ... | ... | ... | ... | |
| THURSDAY 9/22/2016 14:50 | 19% | 9% | 145000 | 21K | ... | |
| THURSDAY 9/22/2016 15:00 | 19% | 9% | 145000 | 21K | ... | "PAST OPERATION STATUS METRICS" THURSDAY 15:20 TO THURSDAY 15:10 |
| THURSDAY 9/22/2016 15:10 | 20% | 8% | 145000 | 20K | ... | |
| ... | ... | ... | ... | ... | ... | |
| THURSDAY 9/29/2016 14:50 | 20% | 12% | 160000 | 23K | ... | "PAST OPERATION STATUS METRICS" THURSDAY 15:20 TO THURSDAY 15:10 |
| THURSDAY 9/29/2016 15:00 CURRENT | 20% | 12% | 160000 | 23K | ... | |

VIRTUAL MACHINE NAME: yyyyyy

500

| TIME POINT | OPERATION STATUS METRICS | | | | |
|---|---|---|---|---|---|
| | CPU USE RATE (%) | MEMORY USE RATE (%) | DISK COMMAND NUMBER (NUM) | NETWORK COMMUNICATION AMOUNT (BYTE) | ... |
| ... | ... | ... | ... | ... | ... |
| THURSDAY 8/25/2016 15:10 | 20% | 11% | 142000 | 23K | ... |
| ... | ... | ... | ... | ... | ... |
| THURSDAY 9/1/2016 15:00 | 20% | 10% | 250000 | 20K | ... |
| THURSDAY 9/1/2016 15:10 | 80% | 40% | 152000 | 21K | ... |
| ... | ... | ... | ... | ... | ... |
| THURSDAY 9/8/2016 15:00 | 21% | 11% | 160000 | 21K | ... |
| THURSDAY 9/8/2016 15:10 | | | | | NOT USED |
| ... | ... | ... | ... | ... | |
| THURSDAY 9/15/2016 15:00 | 22% | 10% | 155000 | 19K | ... |
| THURSDAY 9/15/2016 15:10 | 21% | 10% | 150000 | 92K | ... |
| ... | ... | ... | ... | ... | ... |
| THURSDAY 9/22/2016 15:00 | 19% | 9% | 145000 | 21K | ... |
| THURSDAY 9/22/2016 15:10 | 20% | 8% | 145000 | 20K | ... |
| ... | ... | ... | ... | ... | ... |
| THURSDAY 9/29/2016 15:00 CURRENT | 20% | 12% | 160000 | 23K | ... |

FIG. 21

| NUMBER | FILE NAME | SQC METRICS NAME | UNIT | DESCRIPTION |
|---|---|---|---|---|
| 1 | GCPU | vmgcused | % | USED PHYSICAL CPU USE RATE FOR EACH VIRTUAL MACHINE |
| 2 | | vmgcallmax | MHz | RESOURCE ALLOCATION TO EACH VIRTUAL MACHINE |
| 3 | | vmgcnumcpu | Num | NUMBER OF CPUs |
| 4 | MEM | vmgmallmax | Mbytes | RESTRICTED MEMORY SIZE OF EACH VIRTUAL MACHINE |
| 5 | | vmgmlocp | percent | RATIO OF LOCAL MEMORY SIZE ALLOCATED TO EACH VIRTUAL MACHINE |
| 6 | DISK | vmdcommands | commands | NUMBER OF ISSUED COMMANDS FOR EACH VIRTUAL MACHINE AND EACH STORAGE DEVICE |
| 7 | | vmdreads | Num | NUMBER OF TIMES OF DISK READING FOR EACH VIRTUAL MACHINE AND EACH STORAGE DEVICE |
| 8 | | rndwrites | writes | NUMBER OF TIMES OF DISK READING FOR EACH VIRTUAL MACHINE AND EACH STORAGE DEVICE |
| 9 | | vmdmbread | Mbytes | DISK READING SIZE FOR EACH VIRTUAL MACHINE AND EACH STORAGE DEVICE |
| 10 | | vmdmbwrt | Mbytes | DISK READING SIZE FOR EACH VIRTUAL MACHINE AND EACH STORAGE DEVICE |
| 11 | NET | vmnppckttr | packets | NUMBER OF TRANSFERRED PACKETS FOR EACH PHYSICAL OR VIRTUAL NETWORK DEVICE PORT |
| 1 | | vmnpmvtr | Mbits | TRANSFER SIZE FOR EACH PHYSICAL OR VIRTUAL NETWORK DEVICE PORT |
| 13 | | vmnppcktrecv | packets | NUMBER OF RECEIVED PACKETS FOR EACH PHYSICAL OR VIRTUAL NETWORK DEVICE PORT |
| 14 | | vmnpmbrecv | Mbits | RECEPTION SIZE FOR EACH PHYSICAL OR VIRTUAL NETWORK DEVICE PORT |

2100

FIG. 23
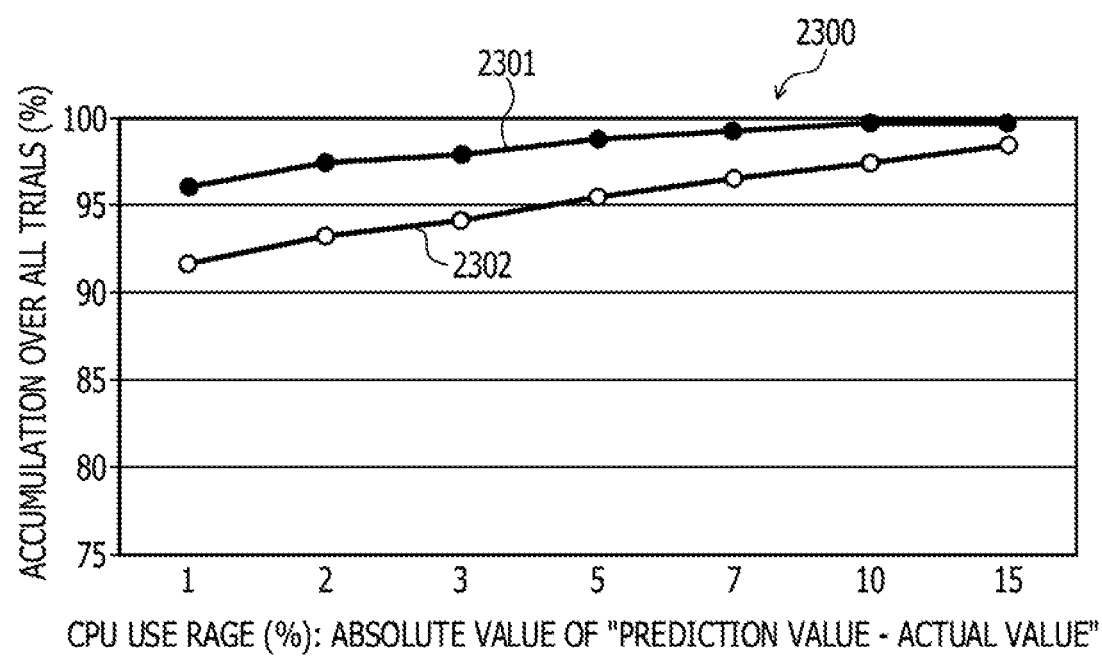
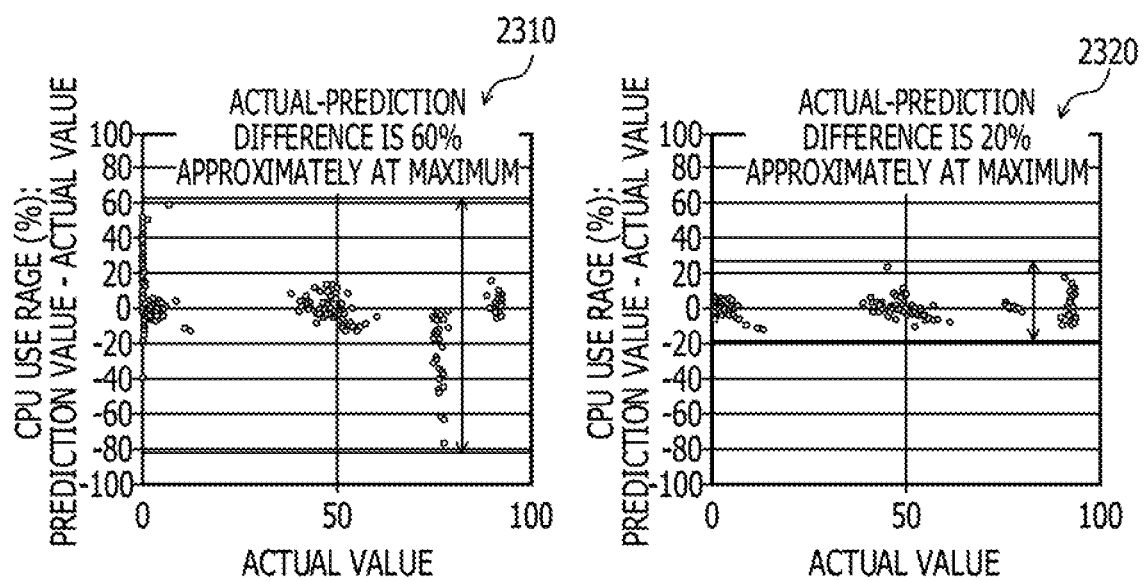

FIG. 24
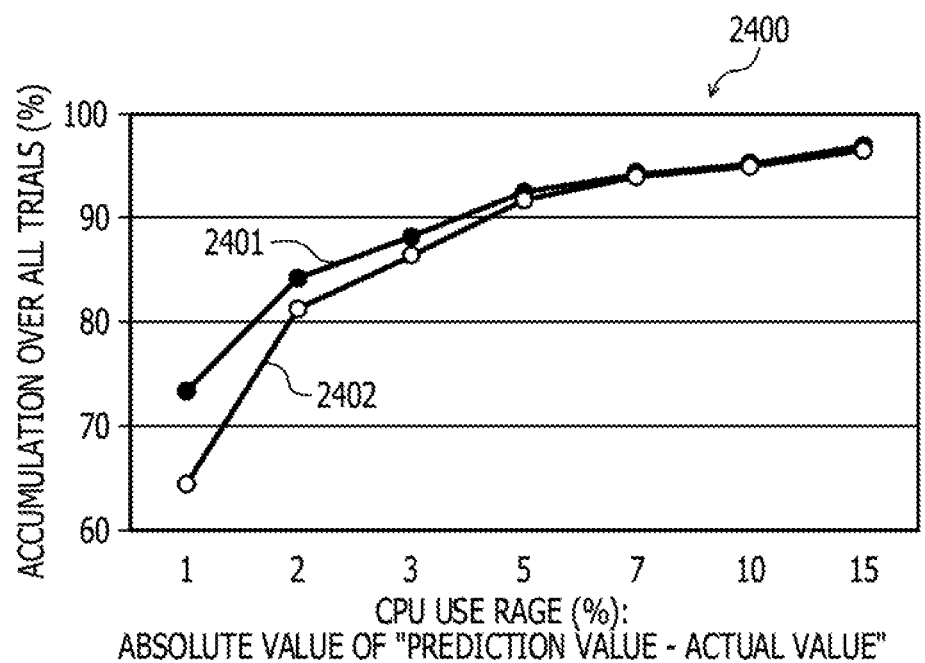
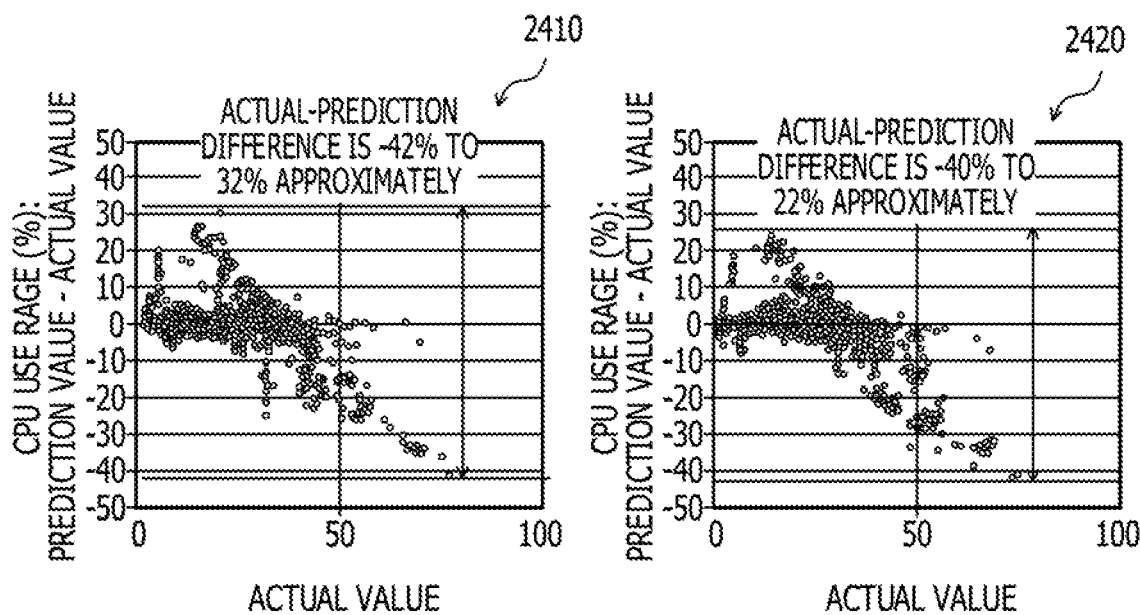

DETERMINING PERIODICITY OF OPERATION STATUS INFORMATION TO PREDICT FUTURE OPERATION STATUSES OF RESOURCES OF THE INFORMATION PROCESSING DEVICES

CROSS-REFERENCE TO RELATED APPLICATION

This application is based upon and claims the benefit of priority of the prior Japanese Patent Application No. 2017-081542, filed on Apr. 17, 2017, the entire contents of which are incorporated herein by reference.

FIELD

The embodiment discussed herein is related to an information processing device, an information processing system control method, and a recording medium recording an information processing management program.

BACKGROUND

A data center provider contracts, with a customer, a service level agreement (SLA) indicating a request level related to, for example, a service content and a service quality.

Related techniques are disclosed in International Publication Pamphlet No. WO 2010/140183 and Japanese Laid-open Patent Publication Nos. 2004-199561 and 2010-117760.

SUMMARY

According to an aspect of the embodiments, an information processing device includes: a memory configured to store a management program; and a processor coupled to the memory, wherein the processor, based on the management program, performs operations of: collecting operation status information stored in a storage of each of one or more information processing devices and related to an operation status of a calculation resource of each of the one or more information processing devices; determining whether the operation status information has periodicity based on the operation status information and a threshold; producing, when it is determined that the operation status information has periodicity, past activation information related to the operation status in a past duration in which the periodicity is present; and generates a prediction value of the operation status information based on the operation status information and the past activation information.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 5 illustrates exemplary storage contents of an activation status DB;
FIG. 6 illustrates exemplary storage contents of a periodicity determination DB;
FIG. 7 illustrates exemplary storage contents of a past activation status DB;
FIG. 13 illustrates exemplary prediction value generation by the management device;
FIG. 14 illustrates exemplary prediction value generation by the management device;
FIG. 15 illustrates exemplary prediction value generation by the management device;
FIG. 17 illustrates exemplary prediction value generation by the management device;
FIG. 18 illustrates exemplary prediction value generation by the management device;
FIG. 19 illustrates exemplary prediction value generation by the management device;
FIG. 20 illustrates exemplary prediction value generation by the management device;
FIG. 21 illustrates an exemplary prediction result;
FIG. 23 illustrates an exemplary prediction result;
FIG. 24 illustrates an exemplary prediction result.

DESCRIPTION OF EMBODIMENT

For example, to satisfy a SLA, a calculation resource such as information processing devices in a data center is managed, and the calculation resource allocated to each virtual machine (VM) at the data center is automatically controlled.

For example, a schedule for disposing multiple virtual servers on multiple physical servers is determined based on future loads on the virtual servers predicted based on loads on the virtual servers in a predetermined duration so far. For example, a resource allocation value of each virtual calculator LPAR (Logical PARtitioning) is calculated based on a prediction value of a use state of a resource of the virtual calculator LPAR and a correlation between the use states of the resources of the virtual calculators LPAR. For example, change of loads on virtual and physical machines with an approximate expression such as a high-order equation is determined or analyzed to detect resource shortage of a physical machine in advance and perform appropriate disposition and movement of virtual machines in a medium and long term.

For example, it may be difficult to predict operation statuses of calculation resources of information processing devices in a data center in the future. For example, it may be difficult to predict future operation statuses of the calculation resources of the information processing devices when no sign is found for change of the operation statuses of the calculation resources before the operation statuses of the calculation resources change in response to a VM execution state. Thus, it may be difficult to control calculation resources allocated to VMs to satisfy a SLA.

For example, a management device configured to accurately predict the future operation statuses of the calculation resources of the information processing devices may be provided.

Figure 1:
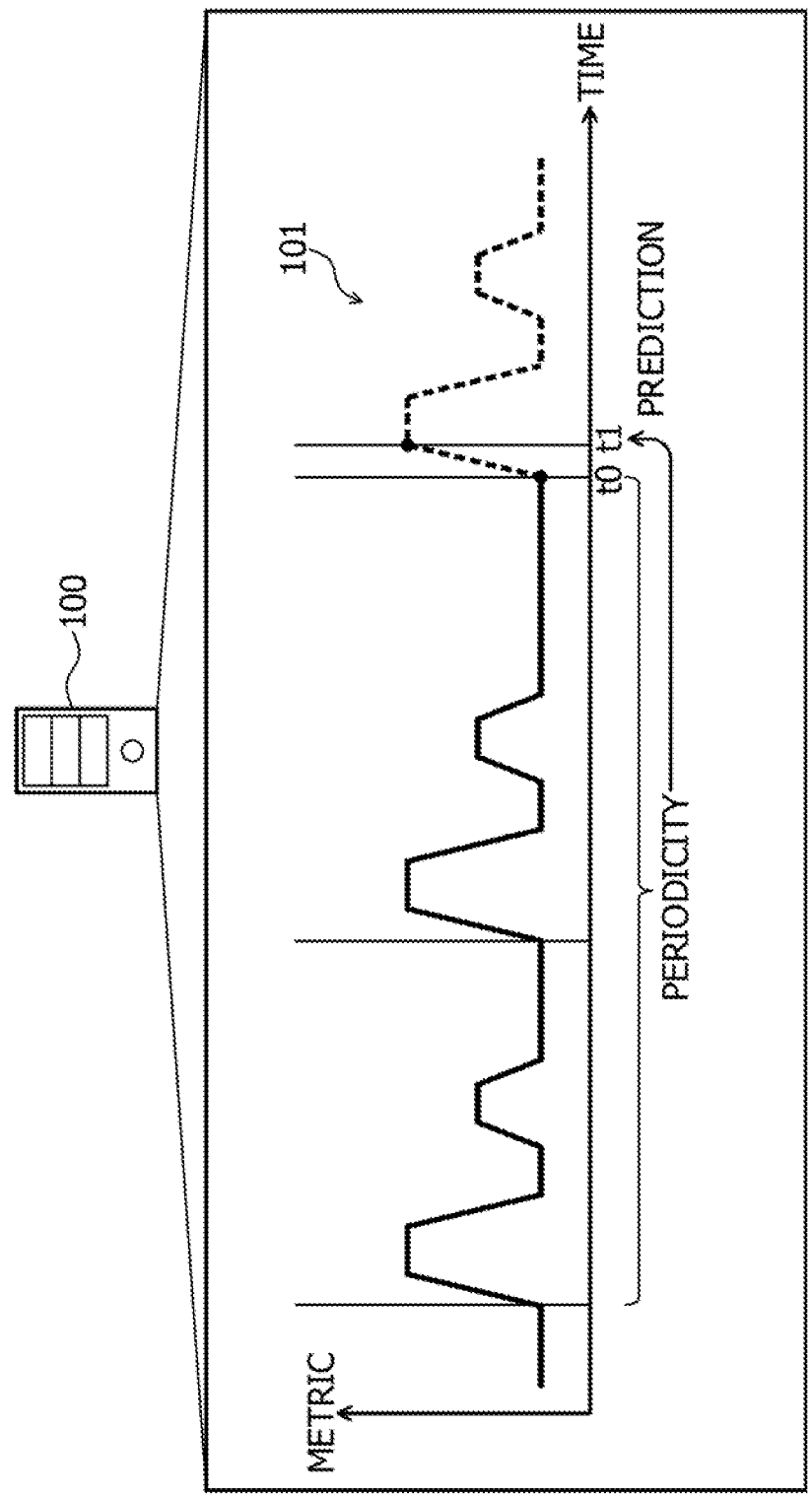
FIG. 1 illustrates an exemplary information processing system control method.

FIG. 1 illustrates an exemplary information processing system control method. A management device 100 is a computer configured to manage an information processing system including multiple information processing devices. Each information processing device is a computer having a calculation resource. The information processing device is, for example, a physical machine such as a server at a data center. The calculation resource is, for example, a central processing unit (CPU) resource of the server.

A virtualization technology of operating one or more VMs on a server may be applied to service that allows use of a calculation resource in a data center for, for example, Infrastructure as a Service (IaaS). For example, the CPU resources of information processing devices are allocated to the one or more VMs, respectively, and each VM is used by a user of the service.

In such a case, a SLA is contracted between a service provider and a service user, and usability desired by the service user tends to be achieved to satisfy the SLA. For example, the SLA may be satisfied by allocating a CPU resource that achieves VM performance desired by the user to a VM executed by a server at a data center and used by the user.

In this case, the amount of CPU resource of the server has an upper limit, and thus the amount of CPU resource allocated to the VM tends to be suppressed. In addition, electric power consumption at the data center tends to be reduced. For example, the electric power consumption may be reduced by suppressing the amount of CPU resource allocated to the VM and reducing the number of servers being activated among servers at the data center.

In this manner, in service that allows use of a data center, it is preferable to reduce electric power consumption at the data center by suppressing the amount of CPU resource allocated to a VM while satisfying a SLA. Thus, the amount of CPU resource allocated to the VM may be controlled so that the electric power consumption at the data center is reduced while the SLA is satisfied.

For example, a processing load of a VM varies with a use status of the VM by a user. Thus, the amount of CPU resource desired to be allocated to the VM so that the electric power consumption at the data center is reduced while the SLA is satisfied varies, too. It may be difficult to control the amount of CPU resource allocated to the VM the electric power consumption at the data center is reduced while the SLA is satisfied.

For example, the amount of CPU resource allocated to the VM so that the electric power consumption at the data center is reduced while the SLA is satisfied is controlled in accordance with, for example, a CPU use rate of the VM, which indicates a current operation status of a CPU resource. In this case, for example, when the CPU use rate of the VM abruptly varies, the CPU resource allocated to the VM may run short so that the SLA is not satisfied in some duration.

For example, in over-commitment, a virtual CPU resource exceeding the actual amount of CPU resource of the server is allocated to the VM. In this case, when the amount of CPU resource used by the VM exceeds the actual amount of CPU resource of the server, performance of the VM may be degraded. Thus, the SLA is potentially not satisfied in a service that allows use of the data center, and thus an undesirable situation may occur in some cases.

For example, the electric power consumption at the data center is reduced while the occurrence of a duration in which the SLA is not satisfied is suppressed by predicting a future CPU use rate of the VM and controlling the amount of CPU resource allocated to the VM in accordance with a result of the prediction. In this case, for example, it may be difficult to accurately predict variation of the CPU use rate of the VM, efficiently control the amount of CPU resource allocated to the VM, and reduce the electric power consumption at the data center while the SLA is satisfied.

For example, the accuracy of predicting the future CPU use rate of the VM is improved by predicting the future CPU use rate of the VM by using a regression model. In this case, for example, there is no sign for variation of the CPU use rate of the VM depending on the use status of the VM by the user and the CPU use rate of the VM abruptly varies in some cases, and thus it may be difficult to accurately predict variation of the CPU use rate of the VM.

For example, an information processing system control method of accurately predicting a future operation status of a calculation resource by taking into consideration periodic variation tendency of a past operation status of the calculation resource may be provided.

As illustrated in FIG. 1, the management device 100 collects operation status information on an operation status of a calculation resource of each information processing device. The operation status information is stored in a storage unit of the information processing device. The operation status information includes an index value for the operation status of the calculation resource at each of multiple time points. The operation status information is, for example, temporally sequential data of an index value of a certain metric as a scale of evaluation of the operation status of the calculation resource. The metric is, for example, the CPU use rate of any VM when the calculation resource is a CPU resource. For example, the management device 100 receives the operation status information from each information processing device.

A graph 101 illustrated in FIG. 1 corresponds to the operation status information and indicates temporal change of the operation status of the calculation resource. The graph 101 illustrated in FIG. 1 represents, as the operation status information, for example, temporally sequential data of an index value of a certain metric as the scale of evaluation of the operation status of the calculation resource. The horizontal axis represents time, and the vertical axis represents the index value of the metric.

The management device 100 determines whether the operation status information has periodicity based on the collected operation status information and a predetermined threshold. As illustrated in FIG. 1, the management device 100 determines that the operation status information has periodicity when the index value has error equal to or smaller than a predetermined threshold at multiple periodic time points in the operation status information. Specifically, the management device 100 determines that the operation status information has periodicity when the index value has error equal to or smaller than the predetermined value at multiple time points at the same time on the day of week.

When having determined that the collected operation status information has periodicity, the management device 100 produces past activation information on the operation status in a predetermined past duration in which the periodicity is present. The past activation information indicates variation tendency of an index value of a metric of the operation status of the calculation resource in a unit duration set to be one period, which represents the operation status in the predetermined past duration. The past activation information is temporally sequential data of an index value of a certain metric of the operation status of the calculation resource at each of multiple time points in the unit duration set to be one period. The management device 100 produces, for example, the past activation information in which statistical values of the index value at multiple time points at the same time on the day of week that are included in the operation status information are set to the index value at the same time on the same day of week in the unit duration.

When having determined that the collected operation status information has periodicity, the management device 100 generates a prediction value of the operation status information based on the collected operation status information and the produced past activation information. The prediction value of the operation status information is, for example, a prediction value predicting a future index value of a certain metric. The management device 100 generates the prediction value of the operation status information by, for example, performing just-in-time (JIT) modeling based on the collected operation status information and the produced past activation information.

The JIT modeling generates a prediction value of an index value of a certain metric by producing a local prediction model based on an index value of at least one metric at a past time point, which satisfies a predetermined condition with an index value of at least one metric at a current time point. The predetermined condition is, for example, a condition that the L2 norm of an index value of each of the at least one metric is equal to or smaller than a predetermined value.

Accordingly, the management device 100 may generate the prediction value of an index value for the operation status of the calculation resource with taken into account variation tendency of the operation status of the calculation resource. Thus, when there is no sign for variation of the operation status of the calculation resource at the current time point, the management device 100 may still accurately predict the prediction value of the index value for the operation status of the calculation resource at a future time point before the operation status of the calculation resource abruptly varies at a future time point.

Thus, the management device 100 controls the calculation resource of each information processing device based on the prediction value so that the electric power consumption at the data center may be efficiently reduced while the SLA is satisfied. For example, the management device 100 may control the CPU resource of the information processing device, which is allocated to each VM, based on the prediction value. The management device 100 may control the calculation resource of the information processing device based on the prediction value to increase the probability that the SLA is satisfied when the electric power consumption is unlikely to be efficiently reduced.

The management device 100 accurately generates, by the JIT modeling, the prediction value of the index value for the operation status of the calculation resource at a future time point for a place such as a data center, in which a physical phenomenon is complicate. The management device 100 accurately generates, by the JIT modeling, the prediction value of the index value for the operation status of the calculation resource at a future time point when the operation status information has a non-linear characteristic.

Figure 2:
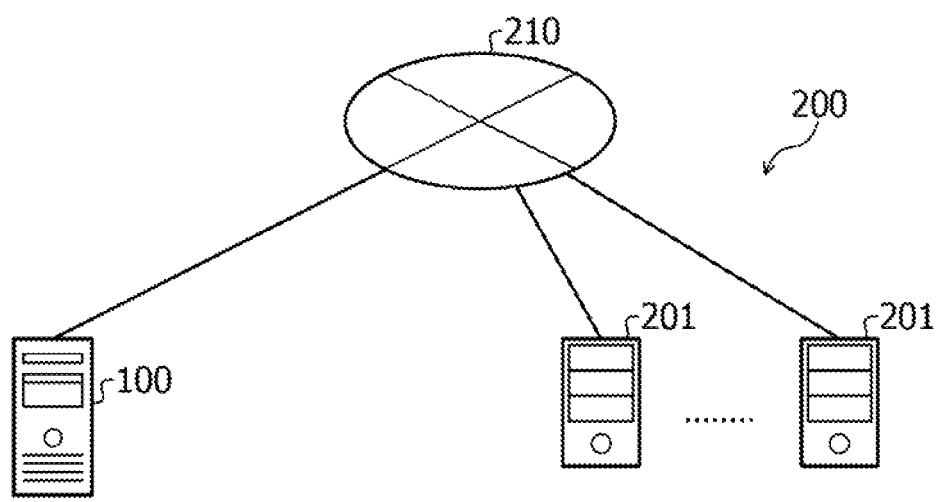
FIG. 2 illustrates an exemplary information processing system.

FIG. 2 illustrates an exemplary information processing system. FIG. 2 illustrates an information processing system 200 to which the management device 100 illustrated in FIG. 1 is applied. As illustrated in FIG. 2, the information processing system 200 includes the management device 100 and an information processing device 201. In the information processing system 200, the management device 100 and the information processing device 201 are connected with each other through a wired or wireless network 210. The network 210 is, for example, a local area network (LAN), a wide area network (WAN), or the Internet.

The management device 100 is a computer configured to manage the information processing device 201. The management device 100 is, for example, a server. The management device 100 is a server at a data center. The management device 100 may be a server outside of the data center. The information processing device 201 is a computer having a calculation resource. The information processing device 201 executes a VM. The information processing device 201 executes the VM through, for example, a host operating system (OS). The information processing device 201 may execute the VM through, for example, a hypervisor. The information processing device 201 is, for example, a server. The management device 100 may be integrated with any of the information processing devices 201.

Figure 3:
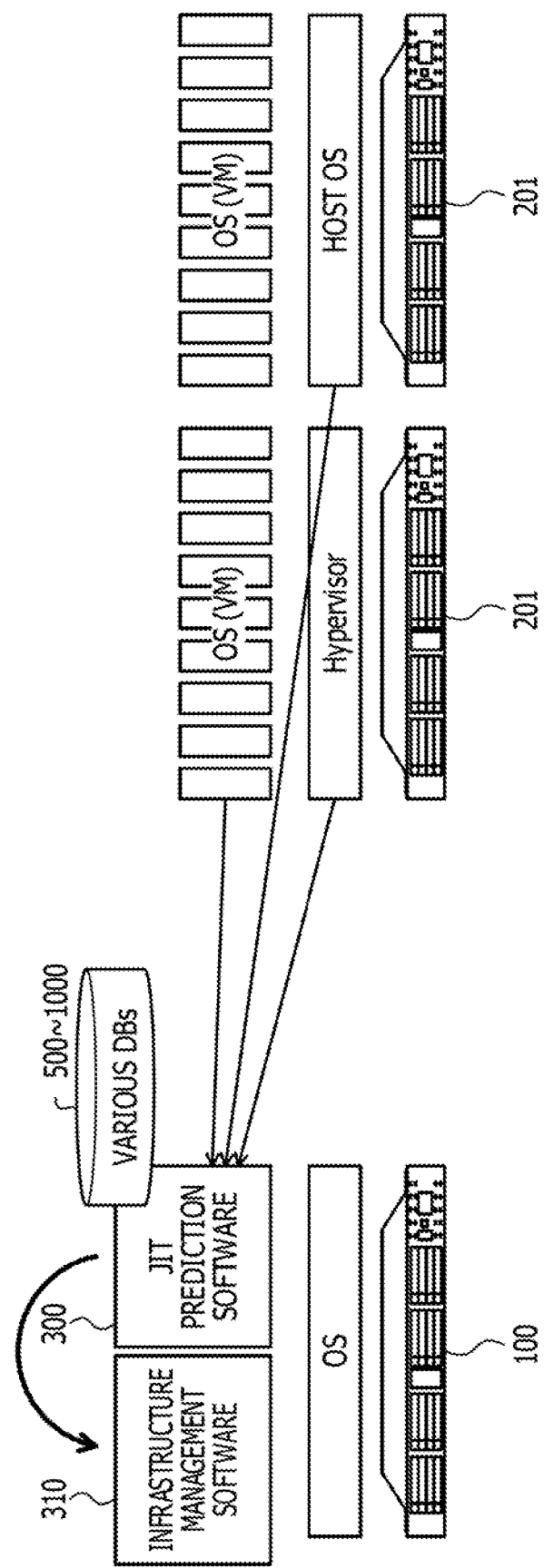
FIG. 3 illustrates exemplary usage of the information processing system.

FIG. 3 illustrates an exemplary information processing system. As illustrated in FIG. 3, the management device 100 operates, on an OS, JIT prediction software 300 and infrastructure management software 310. The management device 100 includes various databases (DBs) 500 to 1000 to be described later with reference to FIGS. 5 to 10. The information processing device 201 operates, on the hypervisor or the host OS, a VM corresponding to the OS.

The management device 100 collects the operation status information from the information processing device 201 at regular time intervals through, for example, the JIT prediction software 300. The management device 100 acquires, for example, performance information from a performance monitor on the OS of the VM and updates an activation status DB 500 to be described later with reference to FIG. 5.

The management device 100 may acquire, for example, hardware event information from hardware event management software on the host OS and update the activation status DB 500 illustrated in FIG. 5. The management device 100 may acquire, for example, hardware event information from a hypervisor API of the information processing device 201 and update the activation status DB 500 illustrated in FIG. 5.

Accordingly, the management device 100 updates the operation status information stored in the activation status DB 500 illustrated in FIG. 5 and including an index value of each of multiple metrics, and updates the activation status DB 500 illustrated in FIG. 5 to a latest state. The management device 100 generates, through the JIT prediction software 300, the prediction value of the operation status information by referring to the activation status DB 500 illustrated in FIG. 5.

The management device 100 controls, through the infrastructure management software 310, the calculation resource of the information processing device 201 based on the prediction value of the operation status of the calculation resource, which is generated through the JIT prediction software 300. The control changes calculation resource allocation to the VM executed by the information processing device 201. The control may change power supply to the calculation resource of the information processing device 201. Accordingly, the management device 100 may achieve reduction of the electric power consumption while the SLA is satisfied.

Figure 4:
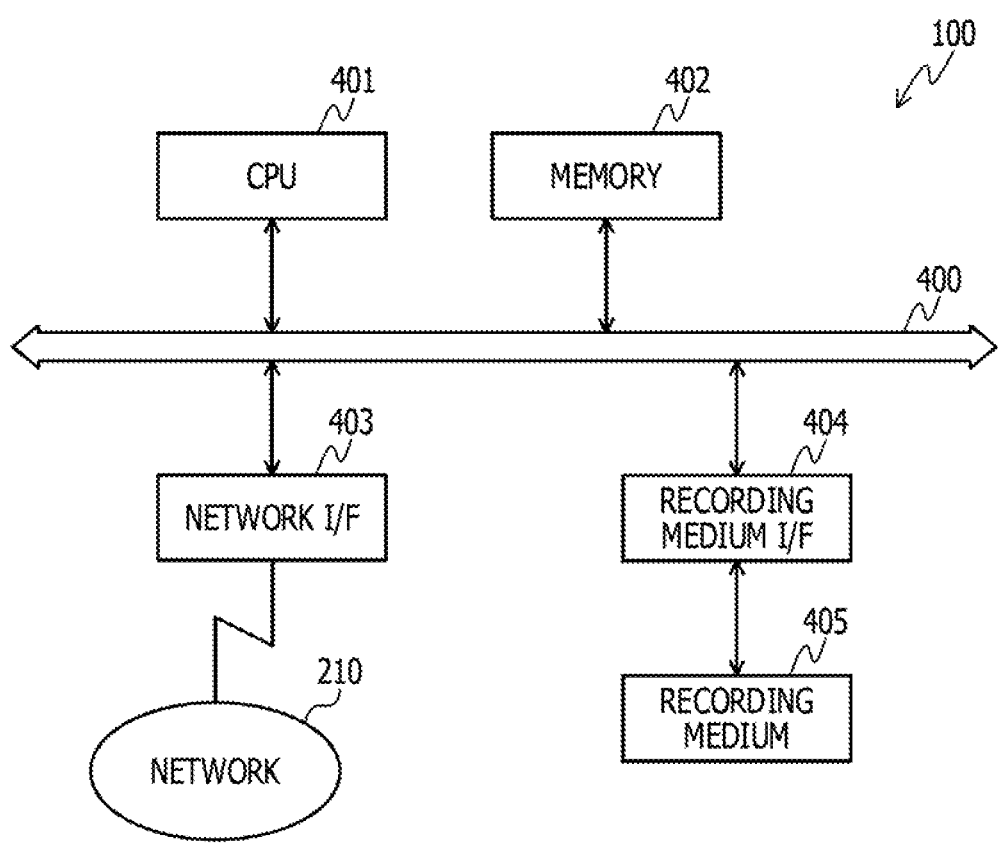
FIG. 4 illustrates an exemplary hardware configuration of a management device.

FIG. 4 illustrates an exemplary hardware configuration of the management device. FIG. 4 illustrates a hardware configuration of the management device 100 included in the information processing system 200 illustrated in FIG. 2. As illustrated in FIG. 4, the management device 100 includes a CPU 401, a memory 402, a network interface (I/F) 403, a recording medium I/F 404, and a recording medium 405. These components are connected with each other through a bus 400.

The CPU 401 governs entire control of the management device 100. The memory 402 includes a read only memory (ROM), a random access memory (RAM), and a flash ROM. For example, the flash ROM and the ROM are store various computer programs, and the RAM is used as a work area of the CPU 401. A computer program stored in the memory 402 is loaded onto the CPU 401, and processing coded therein is executed by the CPU 401.

The network I/F 403 is connected with the network 210 through a communication line and connected with any other computer through the network 210. The network I/F 403 serves as an interface between the network 210 and inside and controls inputting and outputting of data from any other computer. The network I/F 403 may be, for example, a modem or a LAN adapter.

The recording medium I/F 404 controls reading and writing of data from and to the recording medium 405 under control of the CPU 401. The recording medium I/F 404 is, for example, a disk drive, a solid state drive (SSD), or a Universal Serial Bus (USB) port. The recording medium 405 is a non-transitory memory configured to store data written under control of the recording medium I/F 404. The recording medium 405 is, for example, a disk, a semiconductor memory, or a USB memory. The recording medium 405 may be detachable from the management device 100.

The management device 100 may include, for example, a keyboard, a mouse, a display, a printer, a touch panel, a microphone, and a speaker in addition to the above-described components. The management device 100 does not have to include the recording medium I/F 404 and the recording medium 405.

The information processing device 201 may have a hardware configuration same as that of the management device 100.

FIG. 5 illustrates exemplary storage contents of the activation status DB. The activation status DB 500 illustrated in FIG. 5 is achieved by, for example, storage regions such as the memory 402 and the recording medium 405 of the management device 100 illustrated in FIG. 4. The activation status DB 500 may be generated for each VM.

As illustrated in FIG. 5, the activation status DB 500 includes the field of time point and the fields of metrics for evaluation of the operation status of the calculation resource. The metrics are a set of metrics. The activation status DB 500 includes, as the fields of metrics, for example, the field of CPU use rate, the field of memory use rate, the field of disk command number, and the field of network communication amount. The activation status DB 500 stores a data set as a record by setting information to each field for each time point.

The field of time point is a field to which information indicating a time point, such as a date, a day of week, and a time is set. The field of CPU use rate is a field to which the CPU use rate of a VM as an index value of a metric at a time point is set. The unit of the CPU use rate is percentage. The field of memory use rate is a field to which the memory use rate of a VM as an index value of a metric at a time point is set. The unit of the memory use rate is percentage.

The field of disk command number is a field to which a disk command number as an index value of a metric at a time point is set. The unit of disk command number is Num. The field of network communication amount is a field to which a network communication amount as an index value of a metric at a time point is set. The unit of the network communication amount is Byte.

FIG. 6 illustrates exemplary storage contents of periodicity determination. This periodicity determination DB 600 illustrated in FIG. 6 is achieved by, for example, the storage regions such as the memory 402 and the recording medium 405 of the management device 100 illustrated in FIG. 4. The periodicity determination DB 600 may be generated for each VM.

As illustrated in FIG. 6, the periodicity determination DB 600 includes the field of time point in the unit duration set to be one period and the fields of metrics for evaluation of the operation status of the calculation resource. The periodicity determination DB 600 includes, as the fields of metrics, for example, the field of CPU use rate, the field of memory use rate, the field of disk command number, and the field of network communication amount. The periodicity determination DB 600 stores periodicity determination information as a record by setting information to each field for each time point.

The field of time point is a field to which information indicating a time point in the unit duration set to be one period, such as a day of week and a time when the unit duration set to be one period is one week, is set. The field of CPU use rate is a field to which flag information indicating whether the CPU use rate has periodicity for at least one record in the activation status DB 500 corresponding to a time point in the unit duration set to be one period is set.

The flag information is "in predetermined range" indicating existence of periodicity when a difference obtained by subtracting a minimum value of the CPU use rate of at least one record in the activation status DB 500 corresponding to a time point in the unit duration from a maximum value thereof is equal to or smaller than a threshold for the CPU use rate. The flag information is "out of predetermined range" indicating non-existence of periodicity when the difference obtained by subtracting the minimum value of the CPU use rate of at least one record in the activation status DB 500 corresponding to a time point in the unit duration from the maximum value thereof is larger than the threshold for the CPU use rate.

The field of memory use rate is a field to which flag information indicating whether the memory use rate has periodicity for at least one record in the activation status DB 500 corresponding to a time point in the unit duration set to be one period is set.

The flag information is "in predetermined range" indicating existence of periodicity when a difference obtained by subtracting a minimum value of the memory use rate of at least one record in the activation status DB 500 corresponding to a time point in the unit duration from a maximum value thereof is equal to or smaller than a threshold for the memory use rate. The flag information is "out of predetermined range" indicating non-existence of periodicity when the difference obtained by subtracting the minimum value of the memory use rate of at least one record in the activation status DB 500 corresponding to a time point in the unit duration from the maximum value thereof is larger than the threshold for the memory use rate.

The field of disk command number is a field to which flag information indicating whether the disk command number has periodicity for at least one record in the activation status DB 500 corresponding to a time point in the unit duration set to be one period is set.

The flag information is "in predetermined range" indicating existence of periodicity when a difference obtained by subtracting a minimum value of the disk command number of at least one record in the activation status DB 500 corresponding to a time point in the unit duration from a maximum value thereof is equal to or smaller than a threshold for the disk command number. The flag information is "out of predetermined range" indicating non-existence of periodicity when the difference obtained by subtracting the minimum value of the disk command number of at least one record in the activation status DB 500 corresponding to a time point in the unit duration from the maximum value thereof is larger than the threshold for the disk command number.

The field of network communication amount is a field to which flag information indicating whether the network communication amount has periodicity for at least one record in the activation status DB 500 corresponding to a time point in the unit duration set to be one period is set.

The flag information is "in predetermined range" indicating existence of periodicity when a difference obtained by subtracting a minimum value of the network communication amount of at least one record in the activation status DB 500 corresponding to a time point in the unit duration from a maximum value thereof is equal to or smaller than a threshold for the network communication amount. The flag information is "out of predetermined range" indicating non-existence of periodicity when the difference obtained by subtracting the minimum value of the network communication amount of at least one record in the activation status DB 500 corresponding to a time point in the unit duration from the maximum value thereof is larger than the threshold for the network communication amount.

FIG. 7 illustrates exemplary storage contents of a past activation status. This past activation status DB 700 illustrated in FIG. 7 is achieved by, for example, the storage regions such as the memory 402 and the recording medium 405 of the management device 100 illustrated in FIG. 4. The past activation status DB 700 may be generated for each VM.

As illustrated in FIG. 7, the past activation status DB 700 includes the field of time point in the unit duration set to be one period and the fields of metrics for evaluation of the operation status of the calculation resource. The past activation status DB 700 includes, as the fields of metrics, for example, the field of CPU use rate, the field of memory use rate, the field of the disk command number, and the field of the network communication amount. The past activation status DB 700 stores a period data set as a record by setting information to each field for each time point.

The field of time point is a field to which information indicating a time point in the unit duration set to be one period, such as a day of week and a time when the unit duration set to be one period is one week, is set. Date does not have to be set to the field of time point. The field of CPU use rate is a field to which the CPU use rate of a VM as an index value of a metric at a time point is set. The unit of the CPU use rate is percentage. The field of memory use rate is a field to which the memory use rate of a VM as an index value of a metric at a time point is set. The unit of the memory use rate is percentage.

The field of the disk command number is a field to which the disk command number as an index value of a metric at a time point is set. The unit of the disk command number is Num. The field of the network communication amount is a field to which the network communication amount as an index value of a metric at a time point is set. The unit of the network communication amount is Byte.

Figure 8:
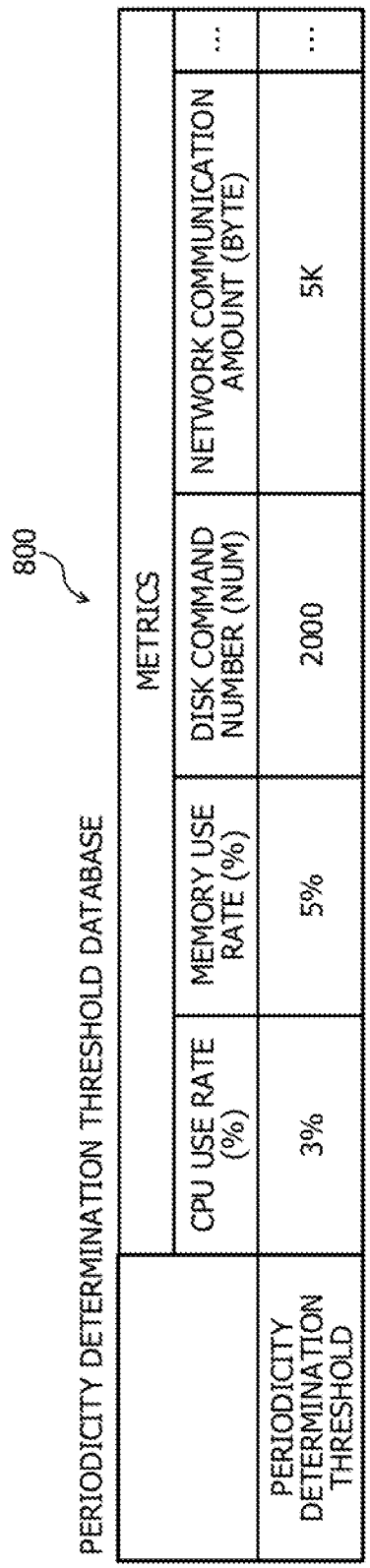
FIG. 8 illustrates exemplary storage contents of a periodicity determination threshold DB.

FIG. 8 illustrates exemplary storage contents of a periodicity determination threshold DB. This periodicity determination threshold DB 800 illustrated in FIG. 8 is achieved by, for example, the storage regions such as the memory 402 and the recording medium 405 of the management device 100 illustrated in FIG. 4. The periodicity determination threshold DB 800 may be generated for each VM.

As illustrated in FIG. 8, the periodicity determination threshold DB 800 includes, for example, the field of CPU use rate, the field of memory use rate, the field of the disk command number, and the field of the network communication amount. The periodicity determination threshold DB 800 stores periodicity determination threshold information as a record by setting information to each field.

The field of CPU use rate is a field to which the threshold for the CPU use rate of a VM set. The unit of the threshold for the CPU use rate is percentage. The field of memory use rate is a field to which the threshold for the memory use rate of a VM is set. The unit of the threshold for the memory use rate is percentage.

The field of the disk command number is a field to which the threshold for the disk command number is set. The unit of the threshold for the disk command number is Num. The field of the network communication amount is a field to which the threshold for the network communication amount is set. The unit of the threshold for the network communication amount is Byte.

Figure 9:
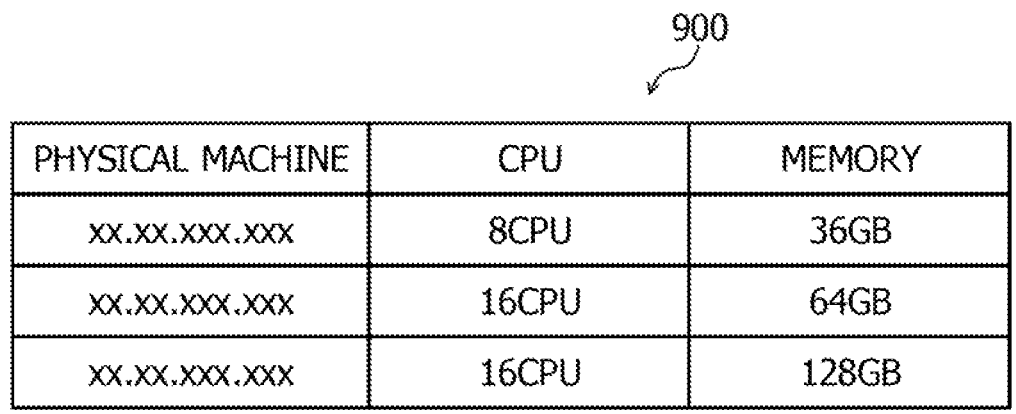
FIG. 9 illustrates exemplary storage contents of a calculation resource management DB.

FIG. 9 illustrates exemplary storage contents of a calculation resource management DB 900. The calculation resource management DB 900 illustrated in FIG. 9 is achieved by, for example, the storage regions such as the memory 402 and the recording medium 405 of the management device 100 illustrated in FIG. 4.

As illustrated in FIG. 9, the calculation resource management DB 900 includes the field of physical machine, the field of CPU, and the field of MEMORY. The calculation resource management DB 900 stores calculation resource management information as a record by setting information to each field for each physical machine.

The field of physical machine is a field to which the address of the information processing device 201 capable of executing a VM is set. The field of CPU is a field to which the number of CPUs included in the information processing device 201 is set. The field of MEMORY is a field to which the size of a storage region of a memory included in the information processing device 201 is set. Accordingly, the calculation resource management DB 900 allows determination of whether the calculation resource of the information processing device 201 may be allocated to a VM.

Figure 10:
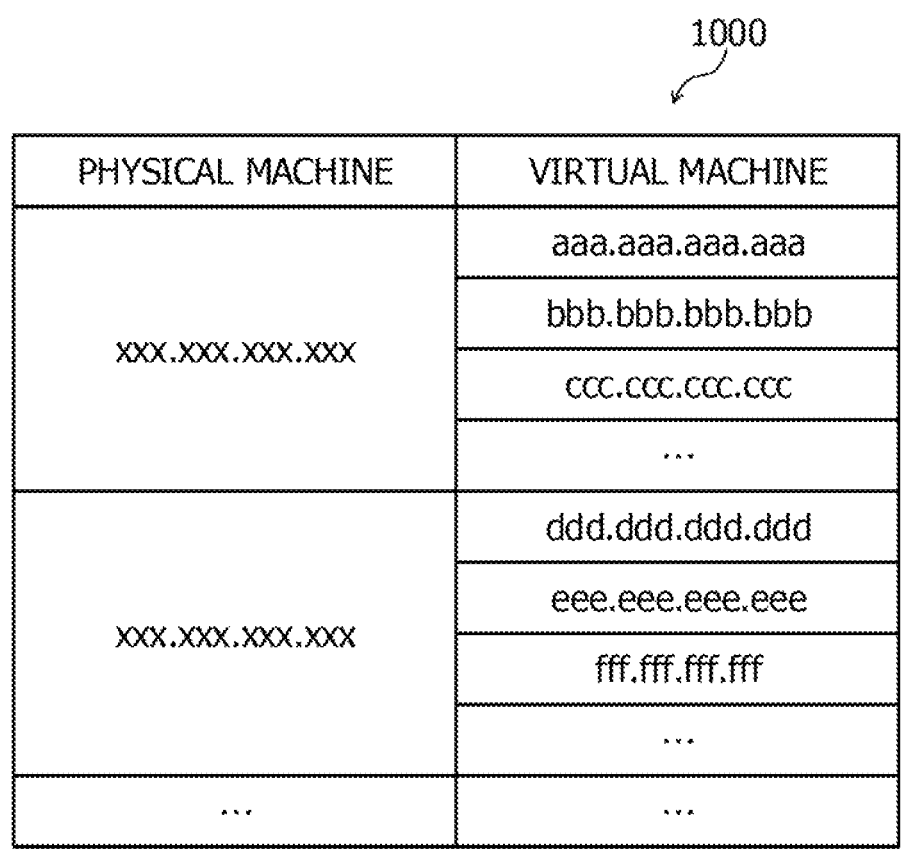
FIG. 10 illustrates exemplary storage contents of a correspondence relation management DB.

FIG. 10 illustrates exemplary storage contents of a correspondence relation management DB. The correspondence relation management DB 1000 illustrated in FIG. 10 is achieved by, for example, the storage regions such as the memory 402 and the recording medium 405 of the management device 100 illustrated in FIG. 4.

As illustrated in FIG. 10, the correspondence relation management DB 1000 includes the field of physical machine and the field of virtual machine. The correspondence relation management DB 1000 stores correspondence relation management information as a record by setting information to each field for each physical machine.

The field of physical machine is a field to which the address of the information processing device 201 capable of executing a VM is set. The field of virtual machine is a field to which the address of a VM allocated to the information processing device 201 is set. Accordingly, the correspondence relation management DB 1000 allows specification of a VM allocated to the information processing device 201.

Figure 11:
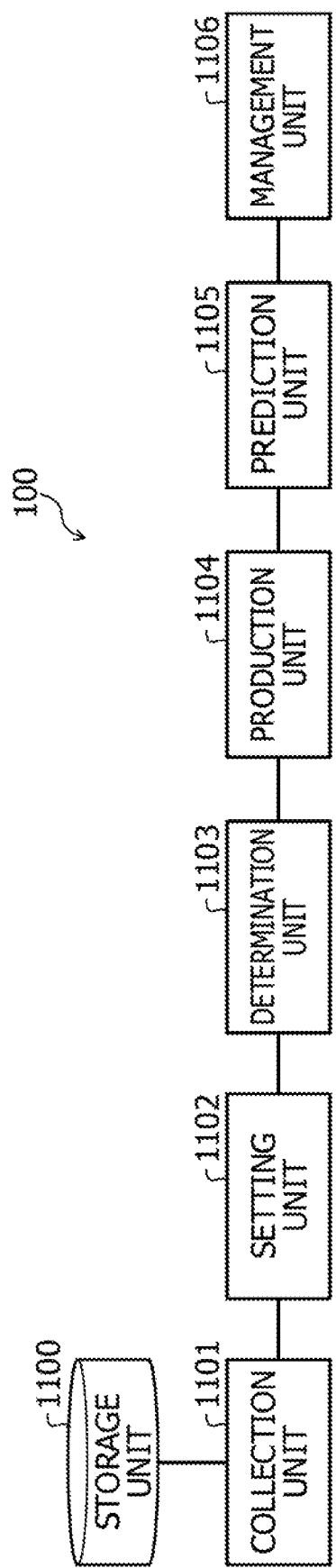
FIG. 11 illustrates an exemplary functional configuration of the management device.

FIG. 11 illustrates an exemplary functional configuration of the management device. The management device 100 includes a storage unit 1100, a collection unit 1101, a setting unit 1102, a determination unit 1103, a production unit 1104, a prediction unit 1105, and a management unit 1106.

The storage unit 1100 is achieved by, for example, the storage regions such as the memory 402 and the recording medium 405 illustrated in FIG. 4. The collection unit 1101 to the management unit 1106 achieve functions of a control unit. The functions of the collection unit 1101 to the management unit 1106 are achieved, for example, by the CPU 401 executing computer programs stored in the storage regions such as the memory 402 and the recording medium 405 illustrated in FIG. 4, or through the network I/F 403. A result of processing by each functional component is stored in, for example, the storage regions such as the memory 402 and the recording medium 405 illustrated in FIG. 4.

The storage unit 1100 stores, for example, thresholds used to determine whether the operation status information, the past activation information, and the operation status information each have periodicity, and information of a calculation resource allocated to each VM. The calculation resource is a resource used for processing at a physical machine and is used, for example, by the VM. The calculation resource is, for example, a CPU resource, a memory resource, or a communication resource of a server.

The operation status information is information including an index value for the operation status of the calculation resource at each of multiple time points. The operation status information includes, for example, an index value for the operation status of the calculation resource of the information processing device 201 at each of multiple time points at a predetermined interval in a target past duration. Specifically, the operation status information is temporally sequential data of an index value of a certain metric as a scale for evaluation of the operation status of the calculation resource. The operation status information is achieved by, for example, the activation status DB 500 illustrated in FIG. 5.

The past activation information is information including a statistical value of an index value for an operation status included in the operation status information and corresponding to each of multiple time points at a predetermined interval in the unit duration set to be one period. The past activation information indicates, for example, variation tendency of an index value of a metric for the operation status of the calculation resource in the unit duration set to be one period, which represents the operation status in a predetermined past duration. The past activation information is, for example, temporally sequential data of an index value of a certain metric for the operation status of the calculation resource at each of multiple time points in the unit duration set to be one period.

The past activation information includes, for example, a statistical value of an index value for the operation status of a calculation resource included in the operation status information at the same time on the day of week among multiple time points in one week set to be one period. The past activation information is achieved by, for example, the past activation status DB 700 illustrated in FIG. 7.

The storage unit 1100 stores, for example, the various DBs illustrated in FIGS. 5 to 10. Accordingly, the storage unit 1100 holds, in a referable state, information used by the collection unit 1101 to the management unit 1106 to perform processing.

The collection unit 1101 collects operation status information on the operation status of the calculation resource of each of the multiple information processing devices 201, which is stored in the storage unit of the information processing device 201. The storage unit of the information processing device 201 is, for example, a memory of the information processing device 201.

The multiple information processing devices 201 each has a calculation resource. The calculation resource of the information processing device 201 is, for example, a calculation resource allocable to a VM. The collection unit 1101 receives, for example, the operation status information from the information processing device 201. The collection unit 1101 may receive information for generating the operation status information from the information processing device 201 and generate the operation status information. Accordingly, the collection unit 1101 collects the operation status information used to generate the prediction value of the operation status information and stores the operation status information in the storage unit 1100.

The setting unit 1102 sets a threshold based on the operation status information. The threshold is a value used by the determination unit 1103 to determine periodicity. The setting unit 1102 sets the threshold based on, for example, the difference between the maximum value and the minimum value of the operation status information. Specifically, the setting unit 1102 sets the threshold to be a value obtained by dividing the difference between the maximum value and the minimum value of an index value in the whole or part of a target duration by a predetermined value. Accordingly, the setting unit 1102 may set the threshold without depending on the ability of a user, which leads to improvement of usability of the management device 100. The setting unit 1102 may set, by using the difference between the maximum value and the minimum value of an index value, the threshold to be relatively large when the index value has relatively large variation, and the threshold to be relatively small when the index value has relatively small variation. Thus, the setting unit 1102 may achieve improved accuracy of periodicity determination.

The setting unit 1102 may set the threshold to be, for example, a value obtained by dividing, by a predetermined value, a statistical value of the difference between the maximum value and the minimum value of an index value in each of multiple partial durations obtained by dividing a target duration by the unit duration set to be one period. The statistical value is, for example, an average value, a center value, or a norm. Accordingly, the setting unit 1102 may set the threshold without depending on the ability of the user, which leads to improvement of usability of the management device 100. Since the setting unit 1102 uses a statistical value of the difference between the maximum value and the minimum value of an index value, the accuracy of periodicity determination may be improved when noise is included in the maximum value and the minimum value of the index value.

The setting unit 1102 may set the unit duration based on the operation status information.

The determination unit 1103 determines whether the operation status information has periodicity based on the operation status information and a threshold. The threshold is a value indicating a boundary for determining whether the variation width of an index value at multiple time points including a common element is in the margin of error. The threshold is, for example, a value indicating a boundary for determining whether the variation width of an index value at multiple time points at the same time on the same day of week is in the margin of error.

The determination unit 1103 determines, for example, whether the difference between the maximum value and the minimum value of an index value included in the operation status information and corresponding to each of multiple time points at a predetermined interval in the unit duration set to be one period is equal to or smaller than a threshold. The determination unit 1103 determines whether the operation status information has periodicity based on a result determined for each of the multiple time points at the predetermined interval in the unit duration set to be one period. Specifically, the determination unit 1103 determines that the operation status information has periodicity when the number of time points for which the difference is determined to be equal to or smaller than the threshold among the multiple time points at the predetermined interval in the unit duration set to be one period is equal to or larger than a predetermined value.

When having determined that the operation status information has periodicity, the production unit 1104 produces the past activation information on the operation status in a predetermined past duration in which the periodicity is present. The production unit 1104 calculates, for example, a statistical value of an index value for an operation status included in the operation status information and corresponding to each of multiple time points at a predetermined interval in the unit duration set to be one period, and produces the past activation information including the calculated statistical value. Specifically, the production unit 1104 produces the past activation information that a statistical value of an index value at multiple time points at the same time on the day of week included in the operation status information is set to the index value at the same time on the same day of week in the unit duration.

When having determined that the operation status information has periodicity, the prediction unit 1105 generates the prediction value of the operation status information based on the operation status information and the past activation information. The prediction value is an index value indicating the future operation status of the calculation resource, and is an index value of a certain metric.

The prediction unit 1105 associates, for example, each of multiple time points in a target duration with an index value at the concerned time point and a statistical value corresponding to a time point in the unit duration corresponding to a time point a predetermined period after the concerned time point. Subsequently, the prediction unit 1105 specifies a combination of the index value and the statistical value that is associated with a time point before a predetermined time point, and that satisfies a predetermined condition with a combination of the index value and the statistical value associated with the predetermined time point.

The predetermined condition is a condition that the L2 norm of the difference between each of the index value and the statistical value associated with the predetermined time point and the corresponding one of the index value and the statistical value associated with a time point before the predetermined time point is equal to or smaller than a predetermined value. Then, the prediction unit 1105 generates the prediction value of the operation status information based on the specified combination. Specifically, the prediction unit 1105 generates the prediction value by using the JIT modeling. Accordingly, the prediction unit 1105 may generate the prediction value of the index value for the operation status of the calculation resource in the future.

When having determined that the operation status information has no periodicity, the prediction unit 1105 generates the prediction value of the operation status information based on the operation status information only. The prediction unit 1105 generates the prediction value by using, for example, the JIT modeling. Accordingly, the prediction unit 1105 may generate the prediction value of the index value for the operation status of the calculation resource in the future.

The management unit 1106 manages the calculation resource of the information processing device 201 based on the prediction value of the operation status information generated by the prediction unit 1105 and a predetermined reference value. The reference value is a predetermined index value for the operation status of the calculation resource of the information processing device 201 related to a VM.

When the prediction value is an index value indicating a larger use degree than the reference value, the management unit 1106 increases the calculation resource of the information processing device 201 allocated to the VM. The management unit 1106 outputs, to the information processing device 201, a control signal for increasing the calculation resource of the information processing device 201 allocated to the VM. Accordingly, the management unit 1106 may control the calculation resource of the information processing device 201, thereby achieving reduction of the electric power consumption at the data center while the SLA is satisfied.

When the prediction value is an index value indicating a smaller use degree than the reference value, the management unit 1106 decreases the calculation resource of the information processing device 201 allocated to the VM. The management unit 1106 outputs, to the information processing device 201, for example, a control signal for decreasing the calculation resource of the information processing device 201 allocated to the VM. Accordingly, the management unit 1106 may control the calculation resource of the information processing device 201, thereby achieving reduction of the electric power consumption at the data center while the SLA is satisfied.

When the calculation resource of the information processing device 201 is allocated to no VM, the management unit 1106 stops power supply to the information processing device 201. The management unit 1106 outputs, to the information processing device 201, for example, a control signal for stopping power supply to the information processing device 201. Accordingly, the management unit 1106 may control the calculation resource of the information processing device 201, thereby achieving reduction of the electric power consumption at the data center while the SLA is satisfied.

The management unit 1106 may output information such as the generated prediction value and the calculation resource allocated to the VM. The outputting is performed in a format such as display on a display, printing output to a printer, transmission to an external device through the network I/F 403, or storage in the storage regions such as the memory 402 and the recording medium 405. Accordingly, the management unit 1106 may allow the user to understand the operation statuses of the calculation resources in the data center.

Figure 12:
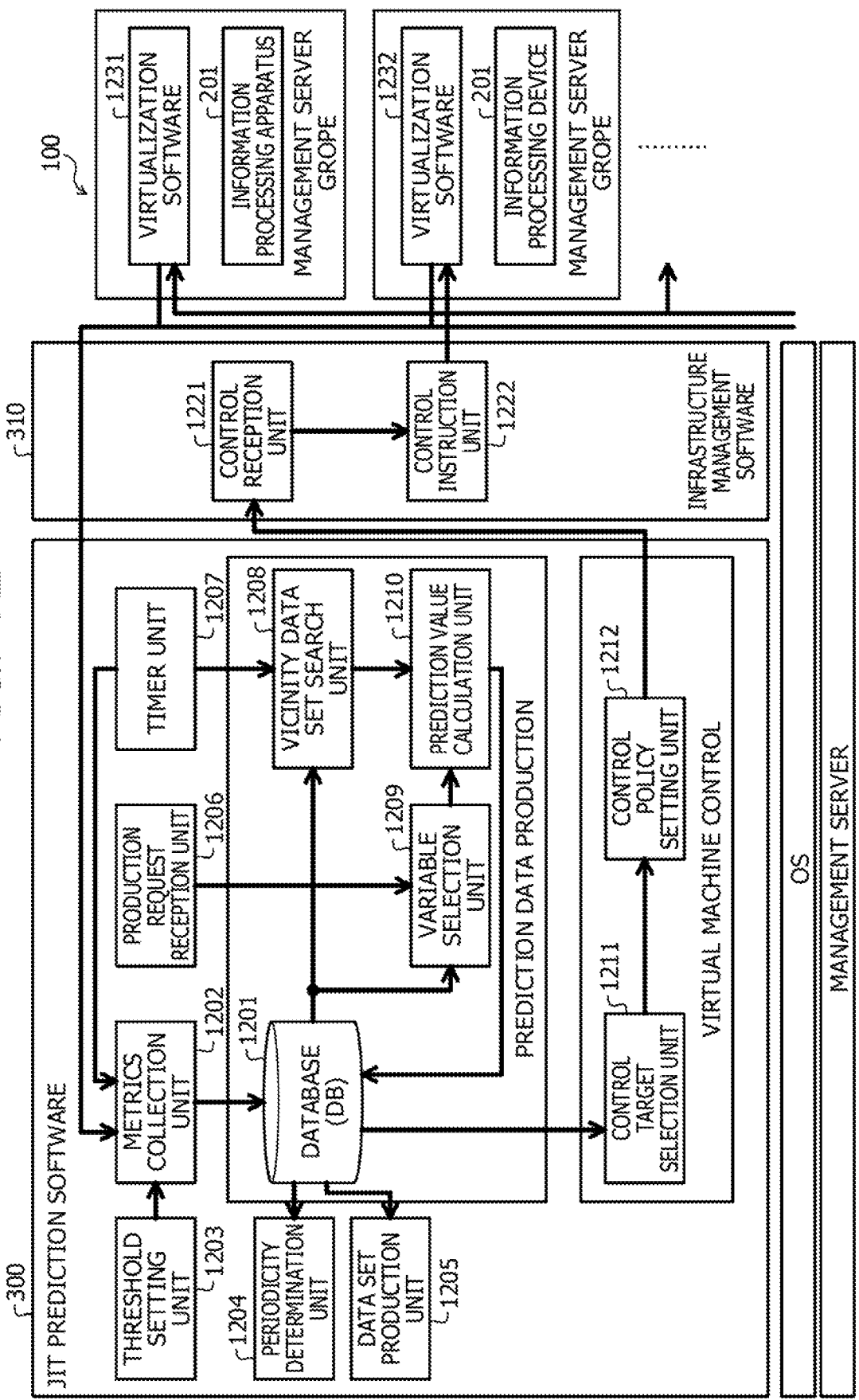
FIG. 12 illustrates an exemplary functional configuration of the management device.

FIG. 12 illustrates an exemplary functional configuration of the management device. As illustrated in FIG. 12, the management device 100 manages, through the JIT prediction software 300, a DB 1201, a metrics collection unit 1202, a threshold setting unit 1203, a periodicity determination unit 1204, and a data set production unit 1205.

The management device 100 manages, through the JIT prediction software 300, a production request reception unit 1206, a timer unit 1207, a vicinity data set search unit 1208, a variable selection unit 1209, and a prediction value calculation unit 1210. The management device 100 manages, through the MT prediction software 300, a control target selection unit 1211 and a control policy setting unit 1212. The management device 100 manages, through the infrastructure management software 310, a control reception unit 1221 and a control instruction unit 1222.

The DB 1201 stores the various DBs illustrated in FIGS. 5 to 10. The metrics collection unit 1202 receives operation data related to the operation status of the calculation resource from the information processing device 201. The metrics collection unit 1202 generates temporally sequential data of an index value of each of multiple metrics based on the received operation data, and stores the generated temporally sequential data as operation status information in the DB 1201.

The threshold setting unit 1203 sets, based on the operation status information, a threshold used to determine whether the operation status information has periodicity, and stores the set threshold in the DB 1201. The periodicity determination unit 1204 determines whether the operation status information in the DB 1201 has periodicity by using the threshold in the DB 1201.

The data set production unit 1205 calculates the moving average value of an index value of a metric over time points at the same time on the same day of week in accordance with a result of the periodicity determination, and stores the calculated moving average value as past activation information in the DB 1201. The data set production unit 1205 generates a data set used to produces a prediction model by connecting the operation status information and the past activation information, and stores the generated data set in the DB 1201.

The production request reception unit 1206 receives a prediction model production request. The prediction model production request is, for example, a production request that specifies a metric as a prediction target, and is input at a predetermined interval. The prediction model production request is automatically input to update a prediction model related to the metric as a prediction target at, for example, a timing of increase or decrease of the number of information processing devices 201 at the data center. The prediction model production request may be, for example, manually input. The prediction model production request may be input at, for example, a set time on every day to update the prediction model related to the metric as a prediction target.

The timer unit 1207 outputs a prediction request to the vicinity data set search unit 1208 at regular time intervals, thereby operating the vicinity data set search unit 1208. The vicinity data set search unit 1208 searches past data sets for a vicinity data set, the L2 norm of which with a latest data set is equal to or smaller than a predetermined threshold. For example, the vicinity data set search unit 1208 calculates the L2 norm of each past data set with the latest data set and specifies, as the vicinity data set, a past data set having a relatively small L2 norm.

The variable selection unit 1209 calculates, by a stepwise method, a coefficient used for a prediction model produced by the JIT modeling. Accordingly, the variable selection unit 1209 periodically updates the prediction model, which leads to improved accuracy of the prediction value calculation.

The prediction value calculation unit 1210 calculates a prediction value of an index value of the metric as a prediction target by inputting the specified vicinity data set to the produced prediction model. Having calculated the prediction value, the prediction value calculation unit 1210 stores the prediction value in the DB 1201. Accordingly, the prediction value calculation unit 1210 periodically calculates the prediction value to allow control of a calculation resource allocated to a VM by the control target selection unit 1211 and the control policy setting unit 1212, thereby achieving reduction of the electric power consumption at the data center.

The control target selection unit 1211 selects a VM as a control target based on the prediction value stored in the DB 1201. The control policy setting unit 1212 determines a control policy for a calculation resource to be allocated to the selected VM. The control policy setting unit 1212 determines, for example, the amount of CPU resource to be allocated to the selected VM or determines the information processing device 201 to which the selected VM is to be moved. The control policy setting unit 1212 outputs the selected VM and the determined control policy to the control reception unit 1221. Accordingly, the control target selection unit 1211 and the control policy setting unit 1212 may achieve reduction of the electric power consumption at the data center while the SLA is satisfied.

The control reception unit 1221 receives the VM as a control target and the control policy from the control policy setting unit 1212, and outputs the VM as a control target and the control policy to the control instruction unit 1222. The control instruction unit 1222 outputs, based on the control policy, a control signal to the information processing device 201 executing the VM as a control target. For example, virtualization software 1231 and 1232 that operate on the information processing device 201 receive the control signal, and controls virtualization environment of the information processing device 201 in accordance with the control signal, thereby controlling allocation of a calculation resource to the VM and the like. Accordingly, the control instruction unit 1222 controls the information processing device 201 and the calculation resource allocated to the VM.

FIGS. 13 to 20 illustrate exemplary prediction value generation by the management device. In the example illustrated in FIGS. 13 to 20, a current time point is "Thursday 9/29/2016 15:00". In the exemplary illustrated in FIGS. 13 to 20, index values of metrics are index values at time points at an interval of 10 minutes. The index values of the metrics may be index values at time points at time intervals different between the metrics.

In FIG. 13, the management device 100 performs processing through the metrics collection unit 1202. The management device 100 checks whether the index values of the metrics for the past one month are stored in the activation status DB 500 of each of multiple VMs. The management device 100 checks, for example, whether the index values of the metrics for the past one month are stored in the activation status DB 500 of a VM having a VM name "xxxxxxx". The following describes processing on the VM having the VM name "xxxxxxx".

When the index values of the metrics for the past one month are not stored, the management device 100 produces a prediction model based on the activation status DB 500 and generates a prediction value for the activation status DB 500 as described later with reference to FIG. 20. When the index values of the metrics for the past one month are stored, the management device 100 determines periodicity of the activation status DB 500 as illustrated in FIG. 14. In FIG. 13, the index values of the metrics for the past one month are stored.

In FIG. 14, the management device 100 performs processing through the threshold setting unit 1203. The management device 100 extracts, from the activation status DB 500 of the VM, the maximum value and the minimum value of an index value in a past unit duration set to be one period, for example, one week. The management device 100 extracts, for example, the maximum value and the minimum value of the CPU use rate in the past one week of "Thursday 9/15/2016 15:00 to Thursday 9/22/2016 15:00".

The management device 100 calculates a difference obtained by subtracting the minimum value from the maximum value. The information processing device 201 calculates, for example, "Difference DIFF indicating the variation width of the CPU use rate in the past one week"="Maximum value MAX of the CPU use rate in the past one week"−"Minimum value MIN of the CPU use rate in the past one week". Specifically, the management device 100 calculates 30% as Difference DIFF indicating the variation width of the CPU use rate in the past one week.

The management device 100 calculates a threshold to be 10% of the difference between the maximum value and the minimum value and stores the threshold in the periodicity determination threshold DB 800. The management device 100 calculates, for example, "Threshold as the threshold for the CPU use rate"="Difference DIFF indicating the variation width of the CPU use rate in the past one week"/10. The management device 100 calculates, for example, the threshold to be 3%, which is 10% of Difference DIFF30% indicating the variation width of the CPU use rate in the past one week, and stores the threshold in the periodicity determination threshold DB 800.

In FIG. 15, the management device 100 performs processing through the periodicity determination unit 1204. The management device 100 extracts, from the activation status DB 500 of the VM, the maximum value and the minimum value for each combination of a day of week, a time, and a metric in a predetermined past duration. The management device 100 extracts, for example, the maximum value "22%" and the minimum value "19%" for a combination of the day of week "(Thursday)", the time "15:00", and the metric "CPU use rate".

The management device 100 calculates a difference obtained by subtracting the minimum value from the maximum value for each combination of a day of week, a time, and a metric. The management device 100 calculates, for example, the difference "3%" obtained by subtracting the minimum value "19%" from the maximum value "22%" for the combination of the day of week "(Thursday)", the time "15:00", and the metric "CPU use rate".

The management device 100 determines whether the difference calculated for each combination of a day of week, a time, and a metric is equal to or smaller than the threshold in the periodicity determination threshold DB 800. The management device 100 determines, for example, that the difference "3%" is equal to or smaller than the threshold "3%" for the combination of the day of week "(Thursday)", the time "15:00", and the metric "CPU use rate".

When the calculated difference is equal to or smaller than the threshold for a combination of a day of week, a time, and a metric, it is indicated that an index value of the metric at the time on the day of week periodically takes the same value. Thus, when the difference is equal to or smaller than the threshold, the management device 100 determines that the activation status DB 500 may have periodicity.

When the difference is equal to or smaller than the threshold for a combination of a day of week, a time, and a metric, the management device 100 stores, in the periodicity determination DB 600, "in predetermined range" indicating that the operation status may have periodicity in association with the combination.

Figure 16:
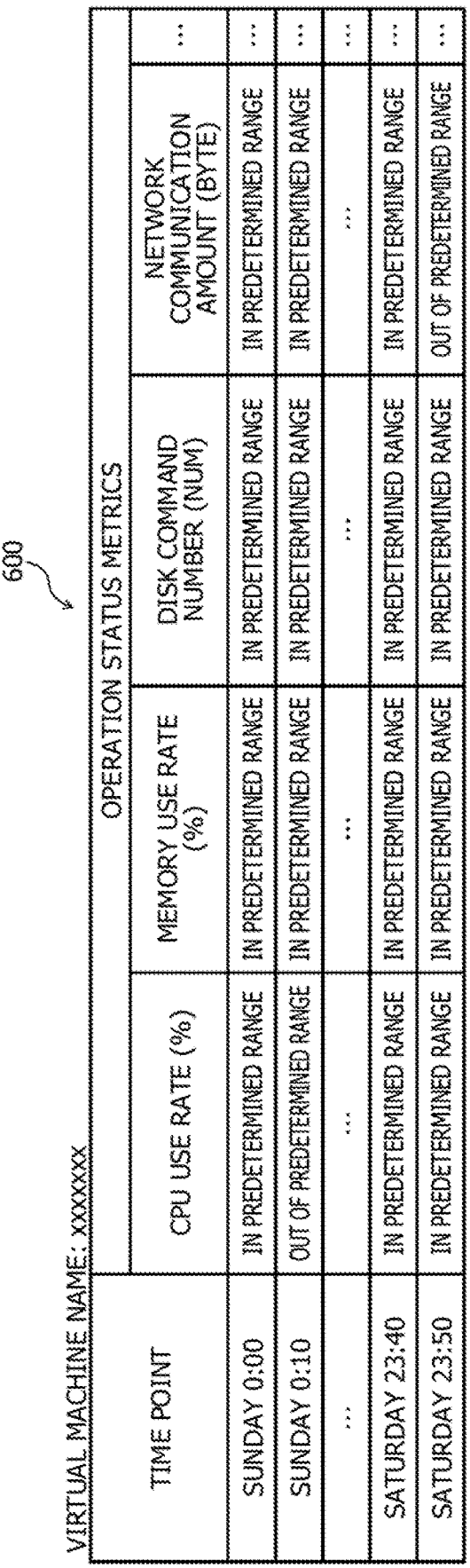
FIG. 16 illustrates exemplary prediction value generation by the management device.

In FIG. 16, the management device 100 performs processing through the periodicity determination unit 1204. The management device 100 calculates the ratio of any combination of a day of week, a time, and a metric for which "in predetermined range" is set among combinations of a day of week, a time, and a metric in the periodicity determination DB 600.

When the calculated ratio is lower than 90%, the management device 100 determines that the activation status DB 500 of the VM has no periodicity, and then produces a prediction model based on the activation status DB 500 and generates a prediction value for the activation status DB 500 as illustrated in FIG. 20.

When the calculated ratio is equal to or higher than 90%, the management device 100 determines that the activation status DB 500 of the VM has periodicity, and then generates the past activation status DB 700 as illustrated in FIG. 17. In the example illustrated in FIG. 16, the management device 100 determines that the ratio is equal to or higher than 90% and the activation status DB 500 of the VM has periodicity.

In FIG. 17, the management device 100 performs processing through the data set production unit 1205. The management device 100 calculates the moving average value of the index value of each metric for each combination of a day of week and a time, and stores the moving average value in the past activation status DB 700. The management device 100 extracts, for example, the CPU use rates "20%, 21%, 22%, 19%" at past four time points for a combination of the day of week "(Thursday)" and the time "15:00", and calculates the moving average value "20.5%". Accordingly, the management device 100 generates the past activation status DB 700 indicating the variation tendency of the index value of each metric corresponding to the operation status of the calculation resource in the unit duration.

In FIG. 18, the management device 100 performs processing through the data set production unit 1205. The management device 100 sorts records in the past activation status DB 700 so that a record corresponding to a time point a predetermined period after the current time point is listed last. The management device 100 sorts records in the past activation status DB 700 so that, for example, a record corresponding to the time point "Thursday 9/29/2016 15:10" 10 minutes after the current time point "Thursday 9/29/2016 15:00" is listed last.

In FIG. 19, the management device 100 performs processing through the data set production unit 1205. The management device 100 connects a record corresponding to each time point in the activation status DB 500 of the VM with a record in the past activation status DB 700 corresponding to a time point a predetermined period after the time point. The management device 100 sets the record in the activation status DB 500 of the VM connected with the record in the past activation status DB 700 to a data set used to produce a prediction model. Accordingly, when no sign of variation of the operation status of the calculation resource appears in the record corresponding to each time point in the activation status DB 500 of the VM, the management device 100 may include, in the data set, information indicating a time point at which abrupt variation would occur.

The management device 100 searches the data sets of the activation status DB 500 of the VM after the connection for a vicinity data set as a set of index values at past time points, the L2 norm of which with the latest data set as a set of index values at the latest time point is equal to or smaller than a predetermined threshold. The management device 100 calculates, for example, the L2 norm of the latest data set and a past data set as a set of index values at each past time point by using Expression (1) below.

$$D_t(k_t,k_q)=\sqrt{(x^{k_q}-x^{k_q})^T(x^{k_q}-x^{k_q})} \quad (1)$$

In the above expression, t represents a past time point, $k_t$ represents a past data set corresponding to the past time point t, $k_q$ represents the latest data set, $D_t(k_t, k_q)$ represents the L2 norm of the latest data set and the past data set corresponding to the past time point t, $x^{k_t}$ represents a vector having the index values of metrics of the past data set as elements, and $x^{k_q}$ represents a vector having the index values of metrics of the latest data set as elements.

Among the past data sets, the management device 100 specifies, as vicinity data sets, 10 past data sets having the smallest calculated L2 norms. Among the past data sets, the management device 100 may specify, as a vicinity data set, every past data set, the calculated L2 norm of which is equal to or smaller than a predetermined threshold.

The management device 100 calculates a prediction value of a metric as a prediction target, for example, the CPU use rate for each specified vicinity data set by using Expression (2) below. The management device 100 calculates the prediction value of the CPU use rate by using, for example, the j-th vicinity data set among n vicinity data sets.

$$\hat{y}_j^{k_q} = \beta_0 + \sum_{i=1}^{m} \beta_i x_i^{k_t} \quad (2)$$

In the above expression, $y_j^{k_q}$ represents the prediction value of the CPU use rate based on the j-th vicinity data set, the hat symbol indicates that the prediction value is an estimation value, $\beta_0$ represents a coefficient, $\beta_i$ represents a coefficient, $x_i^{k_t}$ represents an index value of the i-th metric of the j-th vicinity data set, and m represents the number of metrics, where $\beta_0$ and $\beta_i$ are obtained by using, for example, the stepwise method based on the activation status DB 500.

The management device 100 calculates a statistical value of the calculated prediction values of the CPU use rate by using Expression (3) below. The management device 100 calculates, for example, an average value as the statistical value. The management device 100 may calculate a center value or a percentile as the statistical value.

$$\hat{y}^{k_q} = \sum_{j=1}^{n} \frac{\hat{y}_j^{k_q}}{n} \quad (3)$$

In the above expression, $y^{k_q}$ represents the statistical value of the prediction values of the CPU use rate, and the hat symbol indicates that the statistical value is an estimation value. Accordingly, the management device 100 may calculate, by the JIT modeling, the prediction value of a certain metric indicating the future operation status of a calculation resource, for example, the prediction value of the CPU use rate of a VM. The management device 100 may reflect the possibility of abrupt variation of the operation status of the calculation resource on a prediction model by the JIT modeling, and may accurately calculate the prediction value after the abrupt variation of the operation status of the calculation resource before the variation actually occurs.

The management device 100 may control a calculation resource of the information processing device 201 based on the calculated prediction value of the CPU use rate. The calculation resource is, for example, a CPU resource. The control changes calculation resource allocation to the VM, which is executed by the information processing device 201. The control may change power supply to the calculation resource of the information processing device 201.

For example, the management device 100 increases or decreases allocation of the CPU resource of the information processing device 201 to the VM, which is executed by the information processing device 201. Specifically, when the prediction value of the CPU use rate of the VM exceeds 90% of the CPU resource allocated to the VM, the management device 100 increases the CPU resource allocated to the VM.

For example, when the CPU use rate of the VM exceeds 100% of the CPU resource allocated to the VM and the performance of the VM is relatively highly likely to degrade, the management device 100 increases the CPU resource allocated to the VM. Accordingly, the management device 100 reduces the risk of occurrence of a duration in which the SLA is not satisfied.

For example, when the prediction value of the CPU use rate of the VM is smaller than 50% of the CPU resource allocated to the VM, the management device 100 decreases the CPU resource allocated to the VM while keeping the SLA being satisfied.

For example, when The CPU use rate of the VM is smaller than 50% of the CPU resource allocated to the VM and electric power consumption by a CPU resource not used by the VM is relatively large, the management device 100 may decrease the CPU resource allocated to the VM. Accordingly, the management device 100 efficiently reduces the electric power consumption at the data center while keeping the SLA being satisfied.

For example, the management device 100 moves a VM being executed by the information processing device 201 to another information processing device 201 so that the VM is to be executed by the other information processing device 201. Specifically, the other information processing device 201 has a CPU resource larger than the sum of the prediction values of CPU use rates of VMs executed by the other information processing device 201, and is capable of executing another VM in some cases.

In such a case, the management device 100 moves the VM being executed by the information processing device 201 to the other information processing device 201 capable of executing another VM. Accordingly, the management device 100 reduces the number of information processing devices 201 executing VMs at the data center.

For example, when no VM is executed by the information processing device 201 after the VM having been executed by the information processing device 201 is moved to another information processing device 201, the management device 100 stops power supply to the information processing device 201 executing no VM. Accordingly, the management device 100 efficiently reduces the electric power consumption at the data center.

In FIG. 20, the management device 100 performs processing through the data set production unit 1205. When the activation status DB 500 of the VM has no periodicity, the management device 100 does not generate the past activation status DB 700 nor use records in the past activation status DB 700 as part of a data set used to produce a prediction model. The management device 100 sets, without connection to the past activation status DB 700, a record corresponding to each time point in the activation status DB 500 of the VM to a data set used to produce a prediction model. Similarly to FIG. 19, the management device 100 calculates a prediction value for the activation status DB 500.

Accordingly, when it is difficult to express the variation tendency of the operation status of the calculation resource through production of the past activation status DB 700 because the activation status DB 500 of the VM has no periodicity, the management device 100 does not generate the past activation status DB 700. As a result, the management device 100 reduces decrease of the accuracy of prediction value generation for the activation status DB 500.

FIGS. 21 to 24 illustrate an exemplary prediction result. A table 2100 illustrated in FIG. 21 lists exemplary scales that may be used as metrics. The following describes a case in which the management device 100 generates a prediction value for the activation status DB 500 of the VM, which has periodicity in temporal change of a processing load, by using a metric listed in the table 2100. The VM is, for example, a VM used for Platform as a Service (PaaS).

Figure 22:
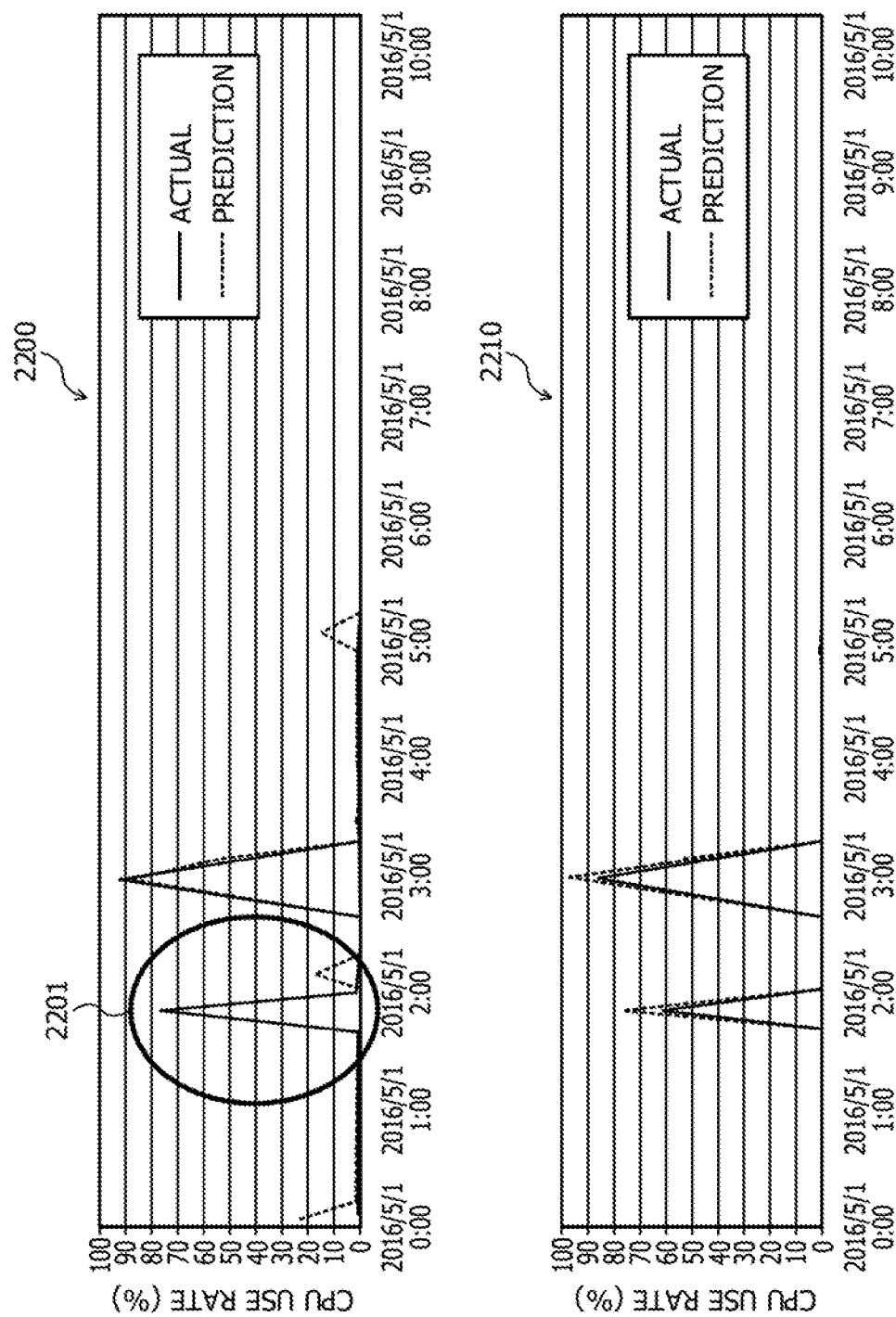
FIG. 22 illustrates an exemplary prediction result.

In FIG. 22, the prediction value is generated for the index value of a metric such as the CPU use rate based on the activation status DB 500 only in some cases. In such a case, the actual value of the CPU use rate and the prediction value of the CPU use rate temporally change as illustrated in a graph 2200 in FIG. 22. The horizontal axis represents time, and the vertical axis represents the CPU use rate. In this case, error between the actual value of the CPU use rate and the prediction value of the CPU use rate is potentially large in a part such as a part 2201 of the graph 2200 illustrated in FIG. 22.

However, the management device 100 may generate a prediction value for the index value of a metric such as the CPU use rate based on the activation status DB 500 connected with the past activation status DB 700. As illustrated in a graph 2210 in FIG. 22, the actual value of the CPU use rate and the prediction value of the CPU use rate temporally change. The horizontal axis represents time, and the vertical axis represents the CPU use rate. As illustrated in the graph 2210 in FIG. 22, the management device 100 may achieve relatively small error between the actual value of the CPU use rate and the prediction value of the CPU use rate.

In FIG. 23, a prediction value is generated for the index value of a metric such as the CPU use rate based on the activation status DB 500 only in some cases. In such a case, the ratio of errors equal to or smaller than a certain value among errors in in a predetermined past duration is distributed as illustrated in a graph 2300 in FIG. 23. The horizontal axis represents an error value, and the vertical axis represents the ratio of errors equal to or smaller than the error value. In this case, 95% of the errors in the predetermined past duration are equal to or smaller than 3% as illustrated with a number line 2302 in FIG. 23.

In this case, the ratio of the difference between the actual value of the CPU use rate and the prediction value of the CPU use rate relative to the actual value of the CPU use rate is distributed as illustrated in graph 2310 in FIG. 23. The horizontal axis represents the actual value, and the vertical axis represents the ratio. In this manner, the difference between the actual value and the prediction value is −80% to 60% of the actual value, and thus the prediction value may not be accurately generated in some cases.

However, the management device 100 generates a prediction value for the index value of a metric such as the CPU use rate based on the activation status DB 500 connected with the past activation status DB 700. The management device 100 achieves such a distribution that 99% of the errors in the predetermined past duration are equal to or smaller than 3% as illustrated with a number line 2301 in FIG. 23.

In this case, the ratio of the difference between the actual value of the CPU use rate and the prediction value of the CPU use rate relative to the actual value of the CPU use rate is distributed as illustrated in a graph 2320 in FIG. 23. The horizontal axis represents the actual value, and the vertical axis represents the ratio. In this manner, the management device 100 suppresses the difference between the actual value and the prediction value to −20% to 20% of the actual value in some cases.

The following describes, with reference to FIG. 24, a case in which the management device 100 generates, by using a metric listed in the table 2100, a prediction value for the activation status DB 500 of a VM that has periodicity in temporal change of a processing load but the processing load of which randomly changes in some cases.

In FIG. 24, a prediction value is generated for the index value of a metric such as the CPU use rate based on the activation status DB 500 only in some cases. In such a case, the ratio of errors equal to or smaller than a certain value among errors in a predetermined past duration is distributed as illustrated in graph 2400 in FIG. 24. The horizontal axis represents an error value, and the vertical axis represents the ratio of errors equal to or smaller than the error value. In this case, 86% of the errors in the predetermined past duration are equal to or smaller than 3% as illustrated with a number line 2402 in FIG. 24.

In this case, the ratio of the difference between the actual value of the CPU use rate and the prediction value of the CPU use rate relative to the actual value of the CPU use rate is distributed as illustrated in graph 2410 in FIG. 24. The horizontal axis represents the actual value, and the vertical axis represents the ratio. In this manner, the difference between the actual value and the prediction value is −42% to 32% of the actual value in some cases.

However, the management device 100 generates a prediction value for the index value of a metric such as the CPU use rate based on the activation status DB 500 connected with the past activation status DB 700. The management device 100 achieves such a distribution that 88% of the errors in the predetermined past duration are equal to or smaller than 3% as illustrated with number line 2401 in FIG. 24.

In this case, the ratio of the difference between the actual value of the CPU use rate and the prediction value of the CPU use rate relative to the actual value of the CPU use rate is distributed as illustrated in graph 2420 in FIG. 24. The horizontal axis represents the actual value, and the vertical axis represents the ratio. In this manner, the management device 100 suppresses the difference between the actual value and the prediction value to −40% to 20% of the actual value.

FIGS. 25 to 28 illustrate exemplary prediction processing. The prediction processing illustrated in FIGS. 25 to 28 is executed by the information processing device 201.

Figure 25:
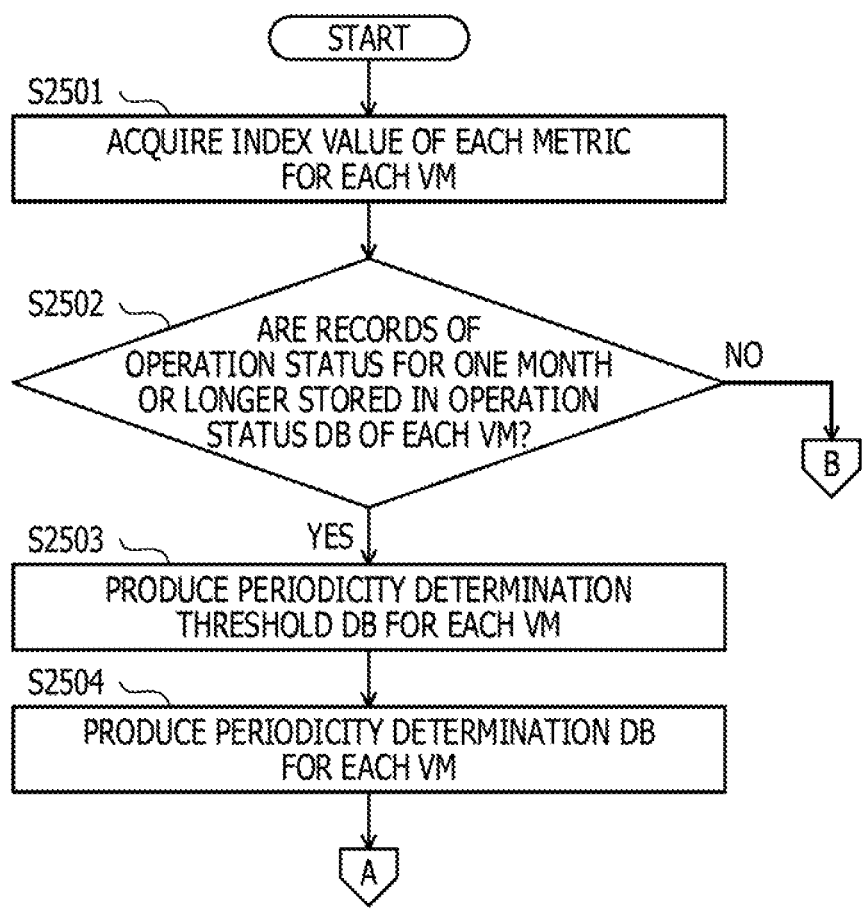
FIG. 25 illustrates exemplary prediction processing.

In FIG. 25, the metrics collection unit 1202 acquires the index value of each of multiple metrics for each of multiple VMs (Operation S2501). Subsequently, the metrics collection unit 1202 determines whether records of the operation status for one month or longer are stored in the activation status DB 500 of each VM (Operation S2502).

Figure 27:
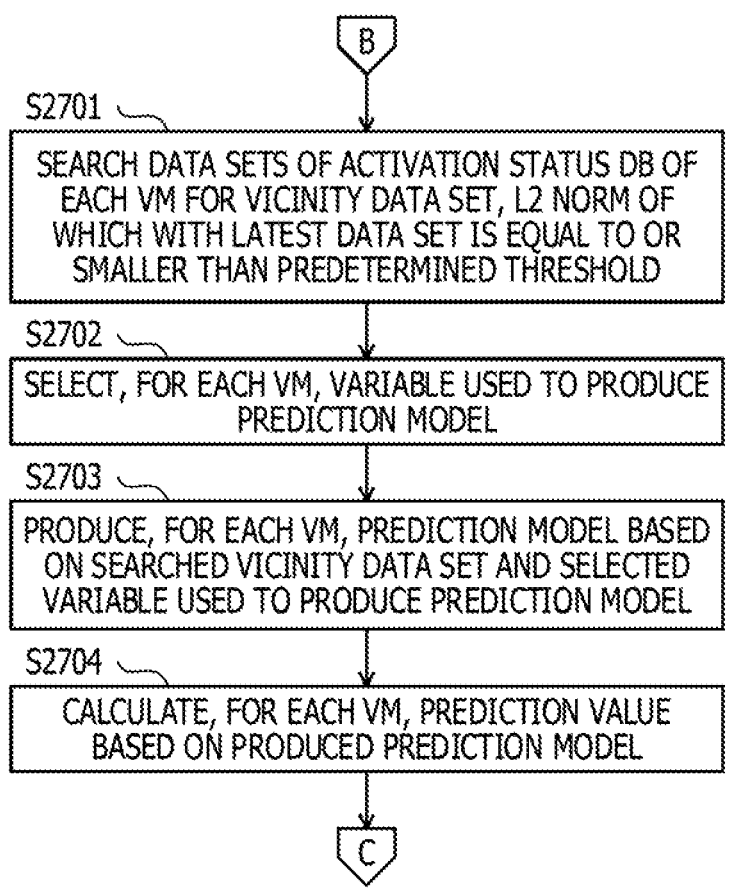
FIG. 27 illustrates exemplary prediction processing.

When the records are not stored (No at Operation S2502), the management device 100 transitions to processing at Operation S2701 illustrated in FIG. 27. When the records are stored (Yes at Operation S2502), the management device 100 transitions to processing at Operation S2503.

At Operation S2503, the threshold setting unit 1203 produces the periodicity determination threshold DB 800 of each VM by referring to the activation status DB 500 of the VM (Operation S2503). The periodicity determination unit 1204 produces the periodicity determination DB 600 of each VM by referring to the activation status DB 500 and the periodicity determination threshold DB 800 of the VM, (Operation S2504). The management device 100 transitions to processing at Operation S2601 illustrated in FIG. 26.

Figure 26:
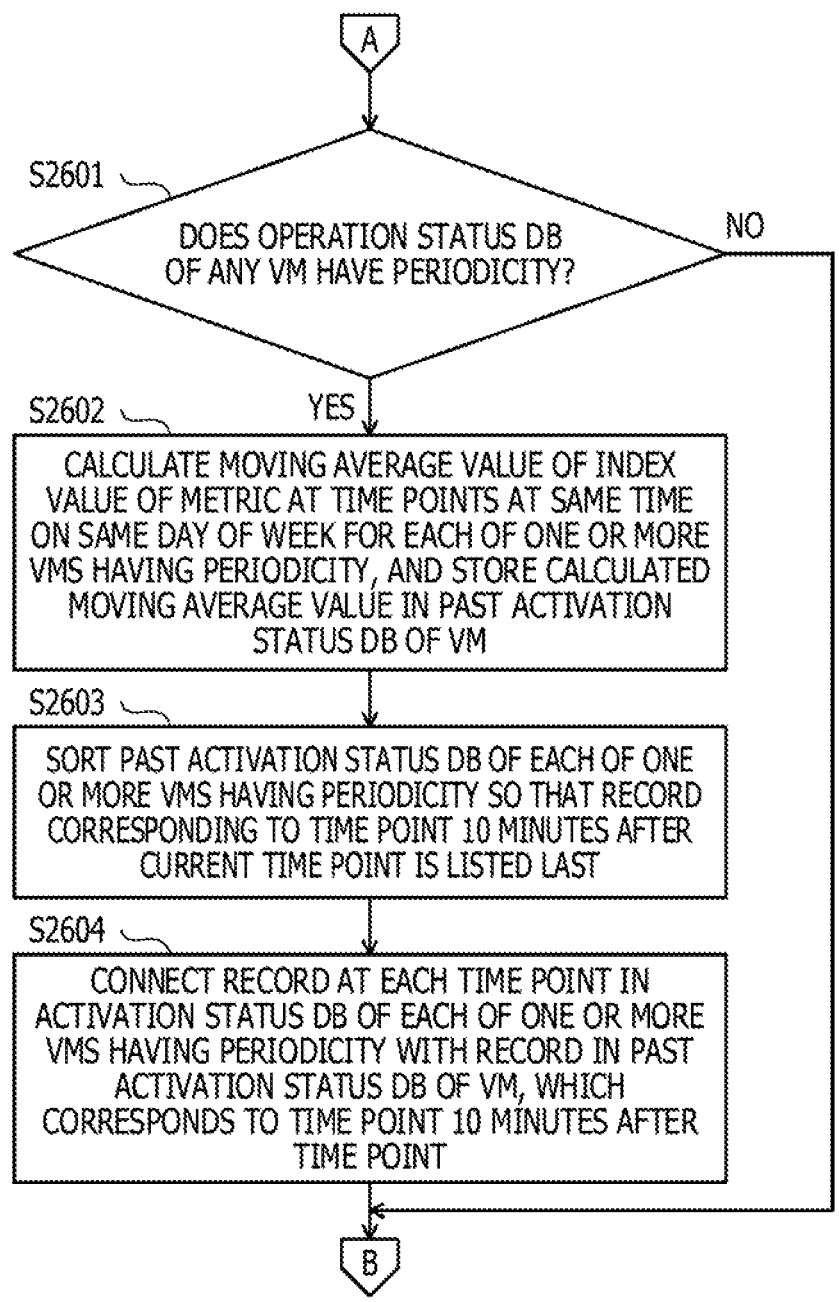
FIG. 26 illustrates exemplary prediction processing.

In FIG. 26, the periodicity determination unit 1204 determines whether the activation status DB 500 of at least any one of the VMs has periodicity by referring to the periodicity determination DB 600 of each VM (Operation S2601).

When the activation status DB 500 has no periodicity (No at Operation S2601), the management device 100 transitions to processing at Operation S2701 illustrated in FIG. 27. When the activation status DB 500 has periodicity (Yes at Operation S2601), the management device 100 transitions to processing at Operation S2602.

At Operation S2602, the data set production unit 1205 calculates the moving average value of the index value of a metric at time points at the same time on the same day of week for each of the one or more VMs having periodicity, and stores the calculated moving average value in the past activation status DB 700 of the VM (Operation S2602). The data set production unit 1205 sorts the past activation status DB 700 of each of the one or more VMs having periodicity so that a record corresponding to a time point 10 minutes after the current time point is listed last (Operation S2603).

The data set production unit 1205 connects a record at each time point in the activation status DB 500 of each of the one or more VMs having periodicity with a record in the past activation status DB 700 of the VM, which corresponds to a time point 10 minutes after the time point (Operation S2604). Subsequently, the management device 100 transitions to processing at Operation S2701 illustrated in FIG. 27.

In FIG. 27, the vicinity data set search unit 1208 receives a prediction value calculation request. Having received the calculation request, the vicinity data set search unit 1208 searches data sets of the activation status DB 500 of each VM for a vicinity data set, the L2 norm of which with a latest data set is equal to or smaller than a predetermined threshold (Operation S2701).

The variable selection unit 1209 selects, for each VM, a variable used to produce a prediction model (Operation S2702). The prediction value calculation unit 1210 produces, for each VM, a prediction model based on the searched vicinity data set and the selected variable used to produce a prediction model (Operation S2703).

The prediction value calculation unit 1210 calculates, for each VM, a prediction value based on the produced prediction model (Operation S2704). The management device 100 transitions to processing at Operation S2801 illustrated in FIG. 28.

Figure 28:
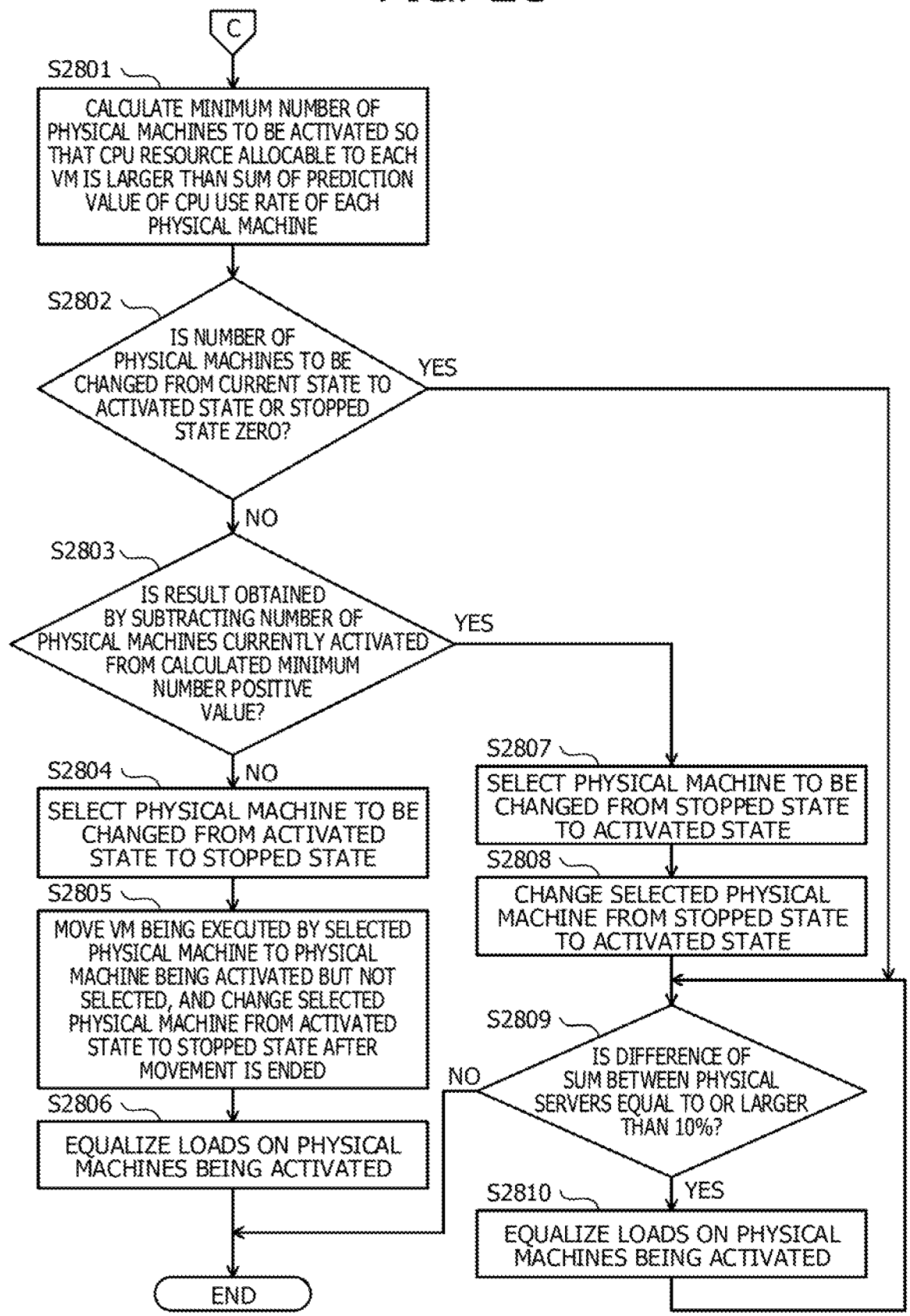
FIG. 28 illustrates exemplary prediction processing.

In FIG. 28, the control policy setting unit 1212 calculates the sum of the prediction value of the CPU use rate of each physical machine by referring to the calculation resource management DB 900 and the correspondence relation management DB 1000. The control policy setting unit 1212 calculates the minimum number of physical machines to be activated so that a CPU resource allocable to each VM is larger than the calculated sum (Operation S2801).

The control target selection unit 1211 calculates the number of physical machines to be changed from the current state to an activated state or a stopped state by referring to the calculation resource management DB 900 and the correspondence relation management DB 1000 and subtracting the number of physical machines currently activated from the calculated minimum number. The control target selection unit 1211 determines whether the calculated number of physical machines is zero (Operation S2802).

When a result of the subtraction is a positive value, the absolute value of the result of the subtraction indicates the number of physical machines that are currently in the stopped state and to be changed from the stopped state to the activated state. When the result of the subtraction is negative value, the absolute value of the result of the subtraction indicates the number of physical machines that are currently in the activated state and to be changed from the activated state to the stopped state.

When the calculated number of physical machines is zero (Yes at Operation S2802), the management device 100 transitions to processing at Operation S2809. When the calculated number of physical machines is not zero (No at Operation S2802), the management device 100 transitions to processing at Operation S2803.

At Operation S2803, the control target selection unit 1211 determines whether a result obtained by subtracting the number of physical machines currently activated from the calculated minimum number is a positive value (Operation S2803).

When the result is a negative value and some of the physical machines being activated are to be changed from the activated state to the stopped state (No at Operation S2803), the management device 100 transitions to processing at Operation S2804.

At Operation S2804, the control policy setting unit 1212 selects any physical machine to be changed from the activated state to the stopped state from among the physical machines being activated (Operation S2804). For example, the Control policy setting unit 1212 sequentially selects a physical machine executing a smaller number of VMs in accordance with the calculated number of physical machines by referring to the correspondence relation management DB 1000.

The control instruction unit 1222 moves each VM being executed by the selected physical machine to a physical machine being activated but not selected, and changes the selected physical machine from the activated state to the stopped state after the movement is ended (Operation S2805).

The control instruction unit 1222 equalizes loads on the physical machines being activated (Operation S2806). For example, the control instruction unit 1222 sequentially selects a VM, the current CPU use rate of which is to be changed by a smaller amount to the prediction value from among VMs being executed by the physical machines being activated, and moves the selected VM between the physical machines, thereby equalizing the loads on the physical machines being activated. The management device 100 ends the prediction processing.

When the result is a positive value and some of the physical machines being activated are to be changed from the stopped state to the activated state (Yes at Operation S2803), the management device 100 transitions to processing at Operation S2807.

At Operation S2807, the control policy setting unit 1212 selects, from among physical machines being stopped, a physical machine to be changed from the stopped state to the activated state (Operation S2807). The control instruction unit 1222 changes the selected physical machine from the stopped state to the activated state (Operation S2808). The control target selection unit 1211 compares the sum of the CPU use rates between physical servers by referring to the correspondence relation management DB 1000, and determines whether the difference of the sum between the physical servers is equal to or larger than 10% (Operation S2809).

When the difference is equal to or larger than 10% (Yes at Operation S2809), the management device 100 transitions to processing at Operation S2810.

At Operation S2810, the control policy setting unit 1212 equalizes loads on physical machines being activated (Operation S2810). For example, the control policy setting unit 1212 sequentially selects a VM, the current CPU use rate of which is to be changed by a smaller amount to the prediction value from among VMs being executed by the physical machines being activated, and moves the VM between the physical machines, thereby equalizing the loads on the physical machines being activated.

When the difference is not equal to or larger than 10% (No at Operation S2809), the management device 100 ends the prediction processing. Accordingly, the management device 100 accurately generates, for example, the prediction value of the CPU use rate of a VM, which indicates the future operation status of the calculation resource. The electric power consumption at the data center may be efficiently reduced while the SLA is satisfied.

The management device 100 collects the operation status information on the operation status of the calculation resource of each of the multiple information processing devices 201, which is stored in the storage unit 1100 of the information processing device 201. The management device 100 determines whether the operation status information has periodicity based on the operation status information and a threshold. When having determined that the operation status information has periodicity, the management device 100 produces the past activation information on the operation status in a predetermined past duration in which the periodicity is present. When having determined that the operation status information has periodicity, the management device 100 generates the prediction value of the operation status information based on the operation status information and the past activation information. Accordingly, the management device 100 may generate the prediction value at improved accuracy.

The management device 100 sets the threshold based on the operation status information. Accordingly, the management device 100 sets the threshold without depending on the ability of the user, which may lead to improved usability of the management device 100.

The management device 100 sets the threshold based on the difference between the maximum value and the minimum value of the operation status information. Accordingly, the management device 100 approximates the order of an index value of operation control information and the order of the threshold by using the difference between the maximum value and the minimum value of an index value, which may lead to improved accuracy of periodicity determination.

The management device 100 sets the threshold to be a value obtained by dividing the difference between the maximum value and the minimum value of an index value in the whole or part of a target duration by a predetermined value. Accordingly, the management device 100 sets, by using the difference between the maximum value and the minimum value of an index value, the threshold to be relatively large when the index value has relatively large variation, and the threshold to be relatively small when the index value has relatively small variation. Thus, the management device 100 approximates the order of an index value of operation control information and the order of the threshold by using the difference between the maximum value and the minimum value of an index value, which may lead to improved accuracy of periodicity determination.

The management device 100 sets the threshold to be a value obtained by dividing, by a predetermined value, a statistical value of the difference between the maximum value and the minimum value of an index value in each of multiple partial durations obtained by dividing a target duration by the unit duration set to be one period. Accordingly, the management device 100 sets the threshold without depending on the ability of the user, which may lead to improved usability of the management device 100. The management device 100 uses a statistical value, which may lead to improved accuracy of periodicity determination when noise is included in the maximum value and the minimum value of an index value.

The management device 100 determines whether the difference between the maximum value and the minimum value of an index value included in the operation status information and corresponding to each of multiple time points at a predetermined interval in the unit duration set to be one period is equal to or smaller than a threshold. The management device 100 determines whether the operation status information has periodicity based on a result of the determination of whether the difference is equal to or smaller than the threshold. Accordingly, the management device 100 determines whether the operation status information has periodicity by assuming a period to be the unit duration set to be one period.

When having determined that the operation status information has no periodicity, the management device 100 generates the prediction value of the operation status information based on the operation status information only. Accordingly, the management device 100 generates no past activation information when it is difficult to express the variation tendency of the operation status of the calculation resource by producing the past activation information since the operation status information has no periodicity. This may lead to reduction of a processing load. As a result, the management device 100 may reduce decrease of the accuracy of prediction value generation without using the past activation information.

The management device 100 associates each of multiple time points in a target duration with an index value at the concerned time point and a statistical value corresponding to a time point in the unit duration corresponding to a time point a predetermined period after the concerned time point. The management device 100 specifies a combination of the index value and the statistical value that is associated with a time point before a predetermined time point, and that satisfies a predetermined condition with a combination of the index value and the statistical value associated with the predetermined time point. The management device 100 generates the prediction value of the operation status information based on the specified combination. Accordingly, the management device 100 achieves the JIT modeling, which may lead to improved accuracy of generation of the prediction value.

The management device 100 calculates the L2 norm of the difference between each of the index value and the statistical value associated with the predetermined time point and the corresponding one of the index value and the statistical value associated with a time point before the predetermined time point. The management device 100 uses, as the predetermined condition, a condition that the calculated L2 norm is equal to or smaller than a predetermined value. Accordingly, the management device 100 may achieve improved accuracy of production of a prediction model by the JIT modeling.

The management device 100 manages the calculation resource of the information processing device 201 based on the generated prediction value of the operation status information and a predetermined reference value. Accordingly, the management device 100 controls the calculation resource of the information processing device 201, which may lead to reduction of the electric power consumption at the data center while the SLA is satisfied.

The management device 100 increases the calculation resource of the information processing device 201 allocated to a virtual machine when the prediction value is an index value indicating a larger use degree than the reference value. Accordingly, the management device 100 controls the calculation resource of the information processing device 201, which may lead to reduction of the electric power consumption at the data center while the SLA is satisfied.

The management device 100 decreases the calculation resource of the information processing device 201 allocated to a virtual machine when the prediction value is an index value indicating a smaller use degree than the reference value. Accordingly, the management device 100 controls the calculation resource of the information processing device 201, which may lead to reduce of the electric power consumption at the data center while the SLA is satisfied.

The management device 100 stops power supply to the information processing device 201 when the calculation resource of the information processing device 201 is allocated to no virtual machine. Accordingly, the management device 100 controls the calculation resource of the information processing device 201, which may lead to reduction of the electric power consumption at the data center while the SLA is satisfied.

The above-described information processing system control method may be achieved by a computer such as a personal computer or a work station executing a computer program prepared in advance. A management program of the management device may be recorded in a computer-readable recording medium such as a hard disk, a flexible disk, a CD-ROM, an MO, or a DVD, and may be read from the recording medium and executed by the computer. The management program of the management device may be distributed through a network such as the Internet.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the spirit and scope of the invention.

What is claimed is:

1. An information processing device comprising:
    a memory configured to store a management program; and
    a processor coupled to the memory,
    wherein the processor, based on the management program, performs operations of:
    collecting operation status information stored in a storage of each of one or more information processing devices which includes one or more central processing units (CPUs) as calculation resource and are activated and related to an operation status of the calculation resource of each of the one or more information processing devices;
    determining whether the operation status information has periodicity based on the operation status information and a threshold;
    producing, when determining that the operation status information has periodicity, past activation information related to the operation status in a past duration in which the periodicity is present;
    generating a prediction value of a central processing unit (CPU) use rate as the operation status information based on the operation status information and the past activation information;
    managing the calculation resource of each of the one or more information processing devices based on the prediction value and a reference value of the central processing unit (CPU) use rate;
    calculating a minimum number of information processing devices for the calculation resource to be allocated to a user based on the prediction value;
    subtracting a number of the one or more information processing devices which are activated from the calculated minimum number;
    selecting and stopping, when a subtracting result is a negative value, one or more first information processing devices from among the one or more information processing devices which are activated,
    selecting and activating, when the subtracting result is a positive value, one or more second information processing devices from among one or more other information processing devices which are not activated; and
    equalizing loads of the one or more other information processing devices which are activated after the selecting and stopping and the selecting and activating.

2. The information processing device according to claim 1, wherein the processor determines the threshold based on the operation status information.

3. The information processing device according to claim 2, wherein the processor determines the threshold based on a difference between a maximum value and a minimum value of the operation status information.

4. The information processing device according to claim 3, wherein
    the operation status information related to the operation status of the calculation resource of each of the one or more information processing devices includes an index value of the operation status of the calculation resource of each of the one or more information processing devices at each of multiple time points at an interval in a past target duration, and
    the processor determines the threshold to be a value obtained by dividing a difference between a maximum value and a minimum value of the index values in whole or part of the past target duration by a specific value.

5. The information processing device according to claim 4, wherein the processor determines the threshold to be a value obtained by dividing, by a specific value, a statistical value of the difference between the maximum value and the minimum value of the index values in multiple partial durations obtained by dividing the past target duration by a unit duration corresponding to one period.

6. The information processing device according to claim 1, wherein
the operation status information related to the operation status of the calculation resource of each of the one or more information processing devices includes an index value of the operation status of the calculation resource of each of the one or more information processing devices at each of multiple time points at an interval in a past target duration, and
the processor determines whether the operation status information has periodicity based on a result of determination of whether a difference between a maximum value and a minimum value of the index values included in the operation status information and corresponding to multiple time points at the interval in a unit duration corresponding to one period is equal to or smaller than the threshold.

7. The information processing device according to claim 1, wherein, when determining that the operation status information has no periodicity, the processor generates the prediction value of the operation status information based on the operation status information only.

8. The information processing device according to claim 1,
wherein the operation status information related to the operation status of the calculation resource of each of the one or more information processing devices includes an index value of the operation status of the calculation resource of each of the one or more information processing devices at each of multiple time points at an interval in a past target duration,
the past activation information related to the operation status in the specific duration includes a statistical value of the index value of the operation status included in the operation status information and corresponding to multiple time points at the interval in a unit duration corresponding to one period, and
the processor:
associates each of the multiple time points in the past target duration with the index value at the corresponding time point and the statistical value corresponding to a time point in the unit duration corresponding to a time point at a period after the corresponding time point;
specifies a combination of the index value and the statistical value that is associated with a time point before the corresponding time point and that satisfies a condition; and
generates the prediction value of the operation status information based on the specified combination.

9. The information processing device according to claim 8, wherein the condition is a condition that an L2 norm of a difference between each of the index value and the statistical value associated with the corresponding time point and each of the index value and the statistical value associated with the time point before the corresponding time point is equal to or smaller than a specific value.

10. The information processing device according to claim 1, wherein
the calculation resource of each of the one or more information processing devices is a calculation resource allocable to a virtual machine to be used by the user,
the reference value is a predetermined index value of the operation status of the calculation resource of each of the one or more information processing devices related to the virtual machine, and
when the prediction value is an index value indicating a larger use degree than the reference value, the processor increases the calculation resources of the one or more information processing devices each allocated to the virtual machine.

11. The information processing device according to claim 1, wherein
the calculation resource of each of the one or more information processing devices is a calculation resource allocable to a virtual machine to be used by the user,
the reference value is a predetermined index value of the operation status of the calculation resource of each of the one or more information processing devices related to the virtual machine, and
when the prediction value is an index value indicating a smaller use degree than the reference value, the processor decreases the calculation resources of the one or more information processing devices each allocated to the virtual machine.

12. The information processing device according to claim 1, wherein the processor stops power supply to the one or more information processing devices when there is no virtual machine to be used by the user to which the calculation resources of the one or more information processing devices are allocated.

13. An information processing system control method comprising:
collecting, by a computer, operation status information stored in a storage of each of one or more information processing devices which includes one or more central processing units (CPUs) as calculation resource and are activated and related to an operation status of the calculation resource of each of the one or more information processing devices;
determining whether the operation status information has periodicity based on the operation status information and a threshold;
producing, when determining that the operation status information has periodicity, past activation information related to the operation status in a past duration in which the periodicity is present;
generating a prediction value of a central processing unit (CPU) use rate as the operation status information based on the operation status information and the past activation information;
managing the calculation resource of each of the one or more information processing devices based on the prediction value and a reference value of the central processing unit (CPU) use rate;
calculating a minimum number of information processing devices for the calculation resource to be allocated to a user based on the prediction value;
subtracting a number of the one or more information processing devices which are activated from the calculated minimum number;
selecting and stopping, when a subtracting result is a negative value, one or more first information processing devices from among the one or more information processing devices which are activated,
selecting and activating, when the subtracting result is a positive value, one or more second information processing devices from among one or more other information processing devices which are not activated; and equalizing loads of the one or more other information processing devices which are activated after the selecting and stopping and the selecting and activating.

14. The information processing system control method according to claim 13, wherein the processor determines the threshold based on the operation status information.

15. The information processing system control method according to claim 14, wherein the processor determines the threshold based on a difference between a maximum value and a minimum value of the operation status information.

16. A non-transitory computer-readable recording medium recording a management program of an information processing device which causes a computer to perform a process, the process comprising:
   collecting operation status information stored in a storage of each of one or more information processing devices which includes one or more central processing units (CPUs) as calculation resource and are activated and related to an operation status of the calculation resource of each of the one or more information processing devices;
   determining whether the operation status information has periodicity based on the operation status information and a threshold;
   producing, when determining that the operation status information has periodicity, past activation information related to the operation status in a past duration in which the periodicity is present;
   generate a prediction value of a central processing unit (CPU) use rate as the operation status information based on the operation status information and the past activation information;
   manage the calculation resource of each of the one or more information processing devices based on the prediction value and a reference value of the central processing unit (CPU) use rate;
   calculate a minimum number of information processing devices for the calculation resource to be allocated to a user based on the prediction value;
   subtract a number of the one or more information processing devices which are activated from the calculated minimum number;
   select and stop, when a subtracting result is a negative value, one or more first information processing devices from among the one or more information processing devices which are activated,
   select and activate, when the subtracting result is a positive value, one or more second information processing devices from among one or more other information processing devices which are not activated; and
   equalizing loads of the one or more other information processing devices which are activated after an operation to select and stop and an operation to select and activate.

17. The non-transitory computer-readable recording medium according to claim 16, wherein the processor determines the threshold based on the operation status information.

18. The non-transitory computer-readable recording medium according to claim 17, wherein the processor determines the threshold based on a difference between a maximum value and a minimum value of the operation status information.

* * * * *